US009809283B2

(12) United States Patent
Zhang

(10) Patent No.: US 9,809,283 B2
(45) Date of Patent: Nov. 7, 2017

(54) MULTIFUNCTIONAL CARRYING DEVICE FOR TIDAL STREAM GENERATOR AND USING METHOD THEREOF

(71) Applicants: Chang Zhang, Zhuhai (CN); Wenyu Zhou, Zhuhai (CN); Yanqian Pan, Zhuhai (CN)

(72) Inventor: Chang Zhang, Zhuhai (CN)

(73) Assignees: Chang Zhang, Zhuhai (CN); Wenyu Zhou, Zhuhai (CN); Yanqian Pan, Zhuhai (CN)

( * ) Notice: Subject to any disclaimer, the term of this patent is extended or adjusted under 35 U.S.C. 154(b) by 0 days.

(21) Appl. No.: 14/902,847

(22) PCT Filed: Jun. 19, 2014

(86) PCT No.: PCT/CN2014/080321
§ 371 (c)(1),
(2) Date: Jan. 4, 2016

(87) PCT Pub. No.: WO2015/000366
PCT Pub. Date: Jan. 8, 2015

(65) Prior Publication Data
US 2016/0152307 A1    Jun. 2, 2016

(30) Foreign Application Priority Data
Jul. 1, 2013 (CN) .......................... 2013 1 0272525

(51) Int. Cl.
*B63B 35/44* (2006.01)
*F03B 13/26* (2006.01)
(Continued)

(52) U.S. Cl.
CPC ............. *B63B 35/44* (2013.01); *B63B 35/00* (2013.01); *F03B 13/26* (2013.01); *F03B 13/264* (2013.01);
(Continued)

(58) Field of Classification Search
CPC .............................. Y02E 10/28; B63B 35/003
See application file for complete search history.

(56) References Cited

U.S. PATENT DOCUMENTS 4,383,182 A  *  5/1983  Bowley ................ F03B 13/183
                                                    290/43
7,948,107 B2 *  5/2011  Fraenkel ............... F03B 13/142
                                                    290/53
8,668,452 B2 *  3/2014  Henriksen .............. B63B 21/50
                                                    415/7

FOREIGN PATENT DOCUMENTS

CH          659687 A5      2/1987
CN        101818717 A      9/2010
(Continued)

OTHER PUBLICATIONS

The World Intellectual Property Organization (WIPO) International Search Report for PCT/CN2014/080321 Sep. 19, 2014.

*Primary Examiner* — Edwin Swinehart
(74) *Attorney, Agent, or Firm* — Anova Law Group, PLLC

(57) ABSTRACT

A multifunctional carrying device for a tidal stream generator and a using method thereof, the multifunctional carrying device for a tidal stream generator comprises: an elongated main floating body; carrying frames, horizontally extending towards the left side and the right side from the center part of the elongated main floating body, an end part of the carrying frames being used for carrying the tidal stream generator; the elongated main floating body being a central floating control pipe (100) with two ends sealed, cable tying locations being positioned at the two ends of the central floating control pipe (100), a pipe air inlet/outlet (702) being disposed above one end of the central floating control pipe (100) and a pipe water inlet/outlet (704) being disposed below the other end of the central floating control pipe (100); a remote air pipe (700), having one end connected to the pipe air inlet/outlet (702) and the other end connected to a control (Continued)

switch (707); the central floating control pipe (100) being connected to the carrying frames using orthogonal node components; and automatic depth-fixing and stabilizing parts (400), evenly disposed, along a vertical bisection plane of the orthogonal node components, on rigid parts that are directly connected to the orthogonal node components. The device has an efficient floating and sinking control function and an automatic depth-fixing and stabilizing function.

10 Claims, 13 Drawing Sheets

(51) Int. Cl.
  *B63B 35/00*  (2006.01)
  *B63B 21/50*  (2006.01)

(52) U.S. Cl.
  CPC ....... *B63B 21/50* (2013.01); *B63B 2035/4466* (2013.01); *F05B 2240/97* (2013.01); *F05B 2260/02* (2013.01); *F05B 2270/18* (2013.01); *Y02E 10/28* (2013.01); *Y02E 10/38* (2013.01)

(56) References Cited

FOREIGN PATENT DOCUMENTS

| | | | |
|---|---|---|---|
| CN | 101818718 | A | 9/2010 |
| CN | 102644538 | A | 8/2012 |
| CN | 102644542 | A | 8/2012 |
| CN | 103334869 | A | 10/2013 |
| KR | 20130066320 | A | 6/2013 |

\* cited by examiner

Enlarged View: C

Enlarged View: E

MULTIFUNCTIONAL CARRYING DEVICE FOR TIDAL STREAM GENERATOR AND USING METHOD THEREOF

CROSS-REFERENCES TO RELATED APPLICATIONS

This application is a national phase entry under 35 U.S.C. §371 of PCT Application No. PCT/CN2014/080321, filed on Jun. 19, 2014, which claims the priority of Chinese patent application No. CN201310272525.6, filed on Jul. 1, 2013, the entire content of all of which is incorporated herein by reference.

FIELD OF THE DISCLOSURE

The present disclosure generally relates to the field of ocean renewable energy generating technologies and, more particularly, relates to a multifunctional carrying device for tidal stream generators and methods for using the same.

BACKGROUND TECHNOLOGIES

Currently, the concerns about petroleum, coal and other fossil based energy consumption are growing due to the ever increasing environmental pollution caused by such consumption. Many countries have treated developing clean and renewable energy sources as an important energy strategy. Tidal-stream energy is an ocean based clean and renewable energy source. Such marine energy source is abundant, dense in coastal areas, predictable, stable and sustainable. Thus, the marine tidal-stream energy is superior to other renewable ocean energy sources in commercial value. Though the market competitiveness of the tidal-stream energy generation is still not competitive enough, from the technical aspect, the commercial competitiveness and perspective of the tidal-stream energy generation are certainly promising as long as certain technologies in tidal stream generators, tidal stream generator carrying device, and tidal-stream energy transmission and distribution are properly addressed at a high level. Currently, some solutions have been made in all these three technologies, but many shortcomings are still remaining. The existing tidal stream generator carrying device may be divided into the following categories based on the configuration format: float carried apparatus, pile carried apparatus, seabed carried apparatus, and semi-submerged float carried apparatus.

INVENTION DISCLOSURE

Technical Problems

The float carried apparatus is easy to install and maintain, but is susceptible to storm damage. The seabed carried apparatus is resilient to storm damage, but is difficult to install and maintain. The pile carried apparatus is easy to maintain and resilient to storm damage, but is costly to manufacture and install. The semi-submerged float carried apparatus is resilient to storm damage and easy to install and maintain, but is structurally complicated such that many modules require individual control and the active control module and execution module are vulnerable to the corrosion and mechanical impact by sea water and other pollutants, causing malfunctions. The existing commercial deployments and operations of tidal stream generators in many countries indicate that it is costly to install and maintain tidal stream generators in the usually harsh ocean environment with strong current. Tidal-stream energy generation projects are often heavy in capital investment and risky in return on investment. To certain extent, the capital investment and investment risk may be reduced by further improving the energy extraction efficiency of tidal turbines, installing high performing direct-drive tidal stream generators, and deploying cost-effective tidal power transmission and distribution technologies. However, the cost and risk of tidal-stream energy generation may remain high due to the poor performance of the carrying device of tidal stream generators that substantially undermines the technology advancements of tidal stream generators. The existing carrying device for tidal stream generator often have poor functionalities and/or are structurally-sophisticated and may not meet the stringent demand for massive commercial deployments of tidal stream generators. Thus, there is a long felt business need to develop a novel carrying device that have rich features, simple structures, and long life span even deployed in harsh high seas and can conveniently mount, install, control and maintain large scale tidal stream generators.

Technical Solutions

The primary objective of the present invention is to provide a multifunctional carrying device for carrying tidal stream generators, with a simple structure, an ability to carry, install, control and maintain large scale tidal stream generators, and an ability to be deeply fixed at any depth levels in high sea waters.

Another objective of the present invention is to provide the multifunctional carrying device that is able to avoid interferences to sea traffic and visual disturbances, and is also able to install the tidal stream generators at desired depths for optimal energy generating efficiency.

Another objective of the present invention is to provide the multifunctional carrying device that is able to facilitate tidal stream generators for an automatic turning under the water.

Another objective of the present invention is to provide the multifunctional carrying device that is capable of automatically turning tidal stream generator and its turbine upright on the land or on surface of sea waters.

Another primary objective of the present invention provides methods of using a multifunctional carrying device for tidal stream generators.

To achieve the objectives described above, the disclosed multifunctional carrying device for a tidal stream generator may include an elongated main floating body; and a carrying frame, extending horizontally toward a left side and a right side from a center part of the elongated main floating body and having an end part used for carrying the tidal stream generator; the elongated main floating body is a central floating control pipe with two ends sealed; the two ends of the central floating control pipe are configured with cable tying locations; a pipe air inlet/outlet is disposed above one end of the central floating control pipe; a pipe water inlet/outlet is disposed below another end of the central floating control pipe; a remote air pipe has one end connected to the pipe air inlet/outlet and has another end connected to a control switch; orthogonal node components are configured to connect the carrying frames with the central floating control pipe; and automatic depth-fixing and stabilizing parts, evenly disposed, along a vertical bisection plane of the orthogonal node components, on rigid parts that are directly connected to the orthogonal node components.

Further, the central floating control pipe is divided into at least two unidirectional floating control cabins; each unidirectional floating control cabin is configured with a cabin air inlet/outlet on an upper side of one end and a cabin water inlet/outlet on a lower side of another end; all the unidirectional floating control cabins are regularly configured according to one direction; the cabin water inlet/outlet located at a front most end of the central floating control pipe is the pipe water inlet/outlet; the cabin air inlet/outlet located at a rear most end of the central floating control pipe is the pipe air inlet/outlet; the central floating control pipe is internally, evenly divided to include at least one sealed cabin; and a connection pipe is configured to have one end connected to the cabin water inlet/outlet of a rear one of two adjacent unidirectional floating control cabins, and to have another end connected to the cabin air inlet/outlet of a front one of adjacent unidirectional floating control cabins.

As disclosed herein, the unidirectional rule means that when the first unidirectional floating control cabin has the air inlet/outlet located on the upper rear side and the water inlet/outlet located on the lower front side, all other unidirectional floating control cabins may have the air inlet/outlet located on the upper rear side and the water inlet/outlet located on the lower front side, and vice versa. The unidirectional floating control cabins may be evenly distributed on the front and rear sides. Thus, the ascending and descending of the carrying device may be properly controlled without posing stringent requirements on the buoyancy force control for the carrying frame and the automatic depth-fixing and stabilizing part. In the meantime, the water flow resistance may be substantially reduced.

Further, the automatic depth-fixing and stabilizing part includes an automatic depth-fixing and stabilizing pipe with both ends sealed; the automatic depth-fixing and stabilizing pipe extends upward from an orthogonal node between the orthogonal node component and the central floating control pipe; and a strengthening rope has one end connected to the top of the automatic depth-fixing and stabilizing pipe and has another end connected to one end of the central floating control pipe.

Thus, the substantially simplified automatic depth-fixing stabilizing structure may reduce the manufacturing and transportation cost and may also make it easy to operate and maintain. The depth-fixing reference may be the sea water surface. When the tidal-stream speed is slow, the carrying device and the carried tidal stream generators may automatically ascend close to the sea water surface. When the tidal-stream speed is fast, the carrying device and the carried tidal stream generators may automatically descend deeper into the sea water.

Further, a sliding float is configured to slide upward and downward along the automatic depth-fixing and stabilizing pipe; and a top frame is configured on top of the automatic depth-fixing and stabilizing pipe to confine a sliding itinerary of the sliding float.

As disclosed herein, the sliding float may be a sealed housing with high mechanical strength or a solid body made of high mechanical strength and lightweight material. Thus, the tidal stream generators may be operated stably and smoothly, and easy to control and maintain. Using the sea water surface as the depth-fixing reference may be able to automatically and precisely set the carrying device and the carried tidal stream generators to the depth in the sea water where the tidal-stream speed is the highest.

Further, a top end of the automatic depth-fixing and stabilizing pipe is connected to one end of an upper depth-fixing rope, the upper depth-fixing rope has another end connected to a depth-fixing floating body; and the depth-fixing floating body is configured to provide a buoyancy force to prevent the tidal stream generator from touching a sea bottom.

As disclosed herein, the depth-fixing floating body may be a single floating body or a plurality of floating bodies combined together. Thus, using the sea water surface as the depth-fixing reference may be able to automatically and precisely set the carrying device and the carried tidal stream generators to the desired depth in the sea water.

Further, the central floating control pipe is configured with rope tying locations on a lower side of both ends; the automatic depth-fixing and stabilizing part includes two lower depth-fixing ropes having equal lengths and a depth-fixing counterweight; and each lower depth-fixing rope has one end connected to one rope tying location of the central floating control pipe and has another end connected to the depth-fixing counterweight, such that the two lower depth-fixing ropes form a V-shape after connection.

Thus, the simplified structure of the automatic depth-fixing and stabilizing part may substantially improve the vertical stability. Using the sea bottom as the depth-fixing reference may be able to automatically and precisely set the carrying device and the carried tidal stream generators to the desired depth in the sea water. In addition, interferences to sea traffic and visual disturbances to scenery views may be avoided.

Further, the orthogonal node component includes an external strengthening pipe, a strengthening connection pipe, a connection shaft, stopper rings, and shaft flanges; the external strengthening pipe is attached to an outer surface of the central floating control pipe; the strengthening connection pipe penetrates horizontally and orthogonally through and attached to each of the external strengthening pipe and the central floating control pipe; the connection shaft is configured passing through the strengthening connection pipe; each of both ends of the connection shaft is configured with one stopper ring and one shaft flange; and the connection shaft is capable of rotating with respect to the strengthening connection pipe.

Thus, the carrying device according to the present disclosure may be to easily mount the unidirectional tidal stream generators with the ability to automatically turn against the tidal flow direction.

Further, a convection-assisted turning arm attached to a rotatable part of the orthogonal node component or to the carrying frame, and extending in a radial direction; a top slider configured on a left side and right side of the top frame; a rope tying location configured on an outer side of the sliding float; and a turning assisting rope configured to have one end connected to the convection-assisted turning arm and to have another end pass through the top slider to be connected to the rope tying location on a same side.

As disclosed herein, the top sliders may be pulleys or components with smooth surfaces and self-lubricating property. Thus, the carrying device according to the present disclosure may be able to mount unidirectional tidal stream generators and automatically control the tidal-stream energy generation. Specifically, when the remote operation and control point feeds compressed air through the remote air pipe, the variable buoyancy force may increase. During the ascending of the central floating control pipe, the carrying frame may produce a substantial upward rotational torque caused by the sliding float, turning assisting ropes and convection-assisted turning arms. This upward rotational torque may automatically turn the tidal stream generators to an upright position with the impellers facing upward and place the tidal stream generators into an upright initial state above the sea water surface. When the impellers ascend above the sea water surface, the tidal stream generators may be shut down automatically. This novel structure may be able to cost effectively control the ascending of the tidal stream generators and the impellers and to automatically shut down the tidal stream generators once above the sea water surface. Thus, the mounting cost, transportation cost, operating cost and maintenance cost of the tidal stream generators may be substantially reduced.

To achieve another primary objective of the present invention, the present invention provides a method of using the multifunctional carrying device for the tidal stream generator, including the following steps:

forming the carrying device for the tidal stream generator;

placing at least two mooring anchors separated by a distance greater than four times of a sea depth according to a flowing direction of the tidal stream, leading two mooring lines from two front and rear mooring anchors such that the two mooring lines having an equal length are converged from opposite directions onto a sea surface; and marking the sea surface using floaters;

on a land or a boat equipped with underwater engineering equipment, carrying a tidal stream generator onto an end of the carrying frame based on a respective upright initial state of the carrying device and the carried tidal stream generator;

using the underwater engineering equipment, moving the carrying device carried with the tidal stream generator in an upright state into a sea water;

dragging the carrying device carried with the tidal stream generator to a target sea water for tidal stream generating, tying the two mooring lines to the cable tying locations at the both ends of the central floating control pipe, and connecting all cables;

when the tidal-stream is absent or when the tidal-stream flows upcoming in a direction from a front end to a rear end of the central floating control pipe, applying a negative air pressure to the remote air pipe through the control switch at a remote control point to gradually fill the central floating control pipe with the sea water until the carrying device reaches a depth where a fixed net buoyancy force completely offsets the sinking force of the carrying device and the carried tidal stream generator, the carrying device stops descending and automatically completes a depth-fixing process; and when the tidal-stream is absent or when the tidal-stream flows upcoming in the direction from the front end to the rear end of the central floating control pipe, feeding compressed air into the remote air pipe at a remote control point to gradually drain all the sea water out of the central floating control pipe to allow the carrying device and the carried tidal stream generator to ascend to above the sea water surface in the upright state.

To achieve another primary objective of the present invention, the present invention provides another method of using the multifunctional carrying device for tidal stream generators, including the following steps:

forming the carrying device for the tidal stream generator;

placing at least two mooring anchors separated by a distance greater than four times of a sea depth according to a flowing direction of the tidal stream, leading two mooring lines from two front and rear mooring anchors such that the two mooring lines having an equal length are converged from opposite directions onto a sea surface; and marking the sea surface using floaters;

on a land or a boat equipped with underwater engineering equipment, assembling a tidal stream generator and the carrying frame based on a respective upright initial state thereof, and using a temporary rope to tie a depth-fixing counterweight to a lower middle section of the central floating control pipe;

using the underwater engineering equipment, moving the carrying device carried with the tidal stream generator in an upright state into a sea water;

dragging the carrying device carried with the tidal stream generator to a target sea water for tidal stream generating and configured with mooring anchors and mooring lines, tying the two mooring lines to the cable tying locations at the both ends of the central floating control pipe, untying the temporary rope to allow the depth-fixing counterweight to descend freely, and connecting all other cables;

when the tidal-stream is absent or when the tidal-stream flows upcoming in a direction from a front end to a rear end of the central floating control pipe, applying a negative air pressure to the remote air pipe through the control switch at a remote control point, when the central floating control pipe is completely filled with the sea water, the depth-fixing counterweight reaches a bottom of the sea water, while the carrying device with the carried tidal stream generator automatically hovers at a pre-set depth; and when the tidal-stream is absent or when the tidal-stream flows upcoming in the direction from the front end to the rear end of the central floating control pipe, feeding compressed air into the remote air pipe at a remote control point to gradually drain all the sea water out of the central floating control pipe to allow the carrying device and the carried tidal stream generator to ascend to above the sea water surface in the upright state.

The methods of using the multifunctional carrying device for tidal stream generators described above may adapt to various sea water conditions whether the sea water is deep or shallow and the sea water surface is calm or stormy. The flexibility of these methods may allow customization to satisfy individual customer need. The low cost carrying device and convenient operation and maintenance may make large scale tidal-stream energy generation more affordable.

The disclosed remote operation and control point may be a generic term for any location that facilitates the operation and control of the multifunctional current power generators. As a convenient mechanism to connect the carrying frame to the central floating control pipe, the orthogonal node component may be a pair of flanges attached to both sides of the central floating control pipe horizontally and orthogonally, a pair of short tubes attached to both sides of the central floating control pipe horizontally and orthogonally, or a connection shaft penetrating the central floating control pipe. Under special circumstances, the carrying frame may be directly soldered or bonded onto the central floating control pipe. The soldering or bonding may be considered as a special orthogonal node component. Balancing may be the front and rear balancing or the left and right balancing. The front and rear balancing may be with reference to the vertical bisection plane of the central floating control pipe. The front and rear balancing may also mean the front and rear symmetry or the front and rear approximate symmetry. The left and right balancing may be with reference to the XZ plane passing through the geometric center of the orthogonal node component. The left and right balancing may also mean the left and right symmetry or the left and right approximate symmetry. The carrying frame may be the sealed floating tubes, ordinary truss frames or pipes with streamlined outer shape. The tidal stream generators carried on the outer ends of the carrying frame may have same dimensions and same wattages, and may be mutually rotating. The automatic depth-fixing and stabilizing part may play the role of automatic depth-fixing and tipping over prevention. The vertical bisection plane of the orthogonal node component may be the XZ plane and the YZ plane (as shown in FIG. 1) with the coordinate system origin located at the geometric center of the orthogonal node component. The rigid parts directly connected to the orthogonal node component may include the orthogonal node component itself, the central floating control pipe, and the carrying frame. Thus, the automatic depth-fixing and stabilizing parts may be configured on the upper or lower side of the central floating control pipe balancing front and rear, and left and right in the XZ plane. Alternatively, the automatic depth-fixing and stabilizing parts may be configured on the upper or lower side of the orthogonal node component and the carrying frame balancing front and rear, and left and right in the YZ plane. Apparently, the automatic depth-fixing and stabilizing parts may have two types. One type of the automatic depth-fixing and stabilizing parts may be connected on the upper side of the central floating control pipe, the orthogonal node component, and the carrying frame. In this case, the sea water surface may be used as the depth-fixing reference. This type of the automatic depth-fixing and stabilizing parts may be floating tubes, floating frames, or the combination of the floating tubes or the floating frames with the upper depth-fixing ropes and the depth-fixing floating body. Another type of the automatic depth-fixing and stabilizing parts may be connected on the lower side of the central floating control pipe, the orthogonal node component, and the carrying frame. In this case, the sea bottom may be used as the depth-fixing reference. This type of the automatic depth-fixing and stabilizing parts may be floating tubes and frames connected to the depth-fixing counterweight by the lower depth-fixing ropes, or the combination of the floating tubes and frames, the lower depth-fixing ropes, and the depth-fixing counterweight. The two types of the automatic depth-fixing and stabilizing parts may be mixed. That is, the automatic depth-fixing and stabilizing parts located on the upper side of the central floating control pipe may be used primarily for stabilizing, and the automatic depth-fixing and stabilizing parts located on the lower side of the central floating control pipe may be used primarily for depth-fixing. Alternatively, the automatic depth-fixing and stabilizing parts located on the upper side of the central floating control pipe may be used primarily for depth-fixing, and the automatic depth-fixing and stabilizing parts located on the lower side of the central floating control pipe may be used primarily for stabilizing. In addition, when the connection between the orthogonal node component and the central floating control pipe is movable or rotatable, the automatic depth-fixing and stabilizing parts may not be configured on the rotatable parts of the orthogonal node component or on the rotatable carrying frame. The details of these methods may be described in various embodiments. The adjustable buoyancy force may come from the central floating control pipe. When the sea water in the central floating control pipe is completely drained, the adjustable buoyancy force may reach the maximum. When the central floating control pipe is completely filled with the sea water, the adjustable buoyancy force may be zero. When the fixed net buoyancy force is equal to the adjustable buoyancy force, the total weight of the sea water displaced by the carrying device and the carried tidal stream generators may be equal to the total weight of the carrying device and the carried tidal stream generators.

Beneficial Effects

The carrying device according to the present disclosure may have the following benefits. (1) The complicated part of the assembling process may be performed during the manufacturing. The field assembling and installation may be simplified. The requirements for large vessel and diving operations may be avoided to the maximum extent. (2) The tidal stream generators may be deployed at any depth at high seas to avoid the adverse impacts from the harsh conditions such as the stormy sea water surface. (3) The carrying device may be especially suitable for mounting, installing, operating, maintaining tidal stream generators in large scale, improve the tidal-stream energy extraction efficiency, and reduce the cost of the electricity generation.

EMBODIMENTS OF THE PRESENT INVENTION

First, it should be noted that, although the present disclosure provides a multifunctional carrying device for tidal stream generators, for illustrative purposes, various embodiments are described with tidal stream generators carried due to the tight coupling of the carrying device with tidal stream generators. Further, the coordinate references of all drawings are same as the coordinate system shown in FIG. 1. Thus, the directions in all drawings are defined with reference to the coordinate system shown in FIG. 1.

Figure 1:
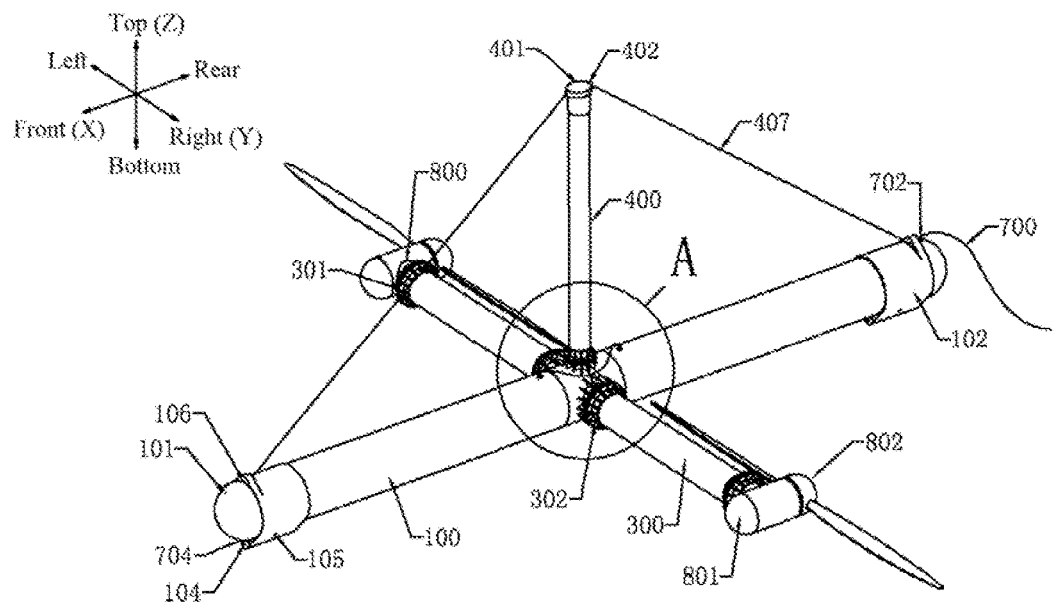
FIG. 1 illustrates a schematic view of an exemplary carrying device for tidal stream generators in an upright initial state according to a first embodiment of the present invention.
Figure 2:
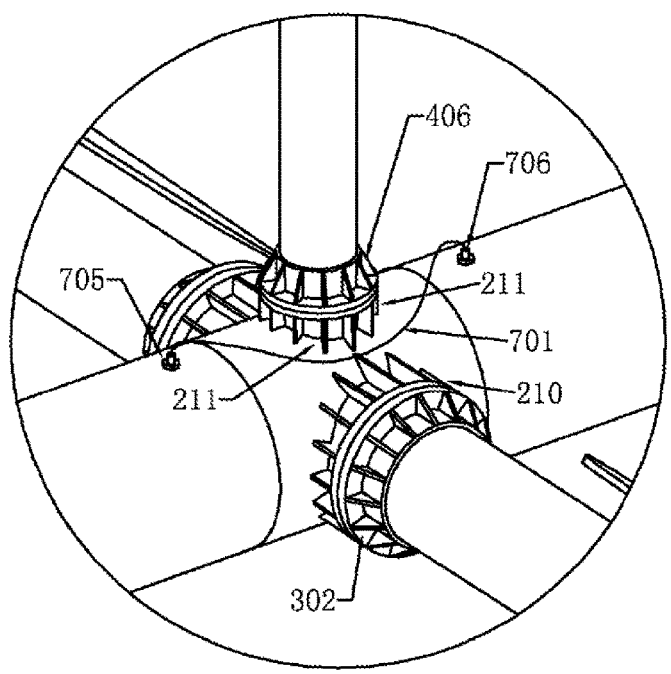
FIG. 2 illustrates an enlarged view of section A in FIG. 1.

First Embodiment of a Multifunctional Carrying Device for a Tidal Stream Generator Referring to FIGS. 1-2, FIG. 1 illustrates a schematic three dimensional view of an exemplary carrying device carrying a tidal stream generator in an upright initial state according to the first embodiment of the present disclosure. The carrying device may include a central floating control pipe 100 having both ends sealed by a front pipe cap 101 and a rear pipe cap 102. The front pipe cap 101 and the rear pipe cap 102 may be configured with a mooring hole 104 and a lanyard hole 105 on the lower side, and a strengthening rope hole 106 on the upper side. The front pipe cap 101 may be configured with a pipe water inlet/outlet 704 on the lower front side. The rear pipe cap 102 may be configured with a pipe air inlet/outlet 702 on the upper rear side. The pipe air inlet/outlet 702 may be connected to a remote air pipe 700. The central floating control pipe 100 may be attached with an orthogonal side flange 210 on the left and right side of the middle part of the central floating control pipe 100 respectively, and an orthogonal upper flange 211 on the upper side of the center of the central floating control pipe 100. The two orthogonal side flanges 210 may be connected to inner flanges 302 of two floating tubes 300 carried on both sides of the central floating control pipe 100. The orthogonal upper flange 211 may be connected to a bottom flange 406 of an automatic depth-fixing and stabilizing part 400. A cabin air inlet/outlet 705 located at the front of the orthogonal upper flange 211 may be connected by a connection pipe 701 to a cabin water inlet/outlet 706 located at the rear of the orthogonal upper flange 211. Outer flanges 301 of the carried floating tubes 300 may be connected to the cabin flanges 800. A tidal stream generator may include the cabin flanges 800, a cabin 801, and impellers 802. The automatic depth-fixing and stabilizing part 400 may be configured with a top cap 401 on the top. The top cap 401 may be configured with top cap hole(s) 402. Each of the two strengthening ropes 407 may be connected to the top cap hole 402 on one end and to the strengthening rope hole 106 on the other end.

Figure 3:
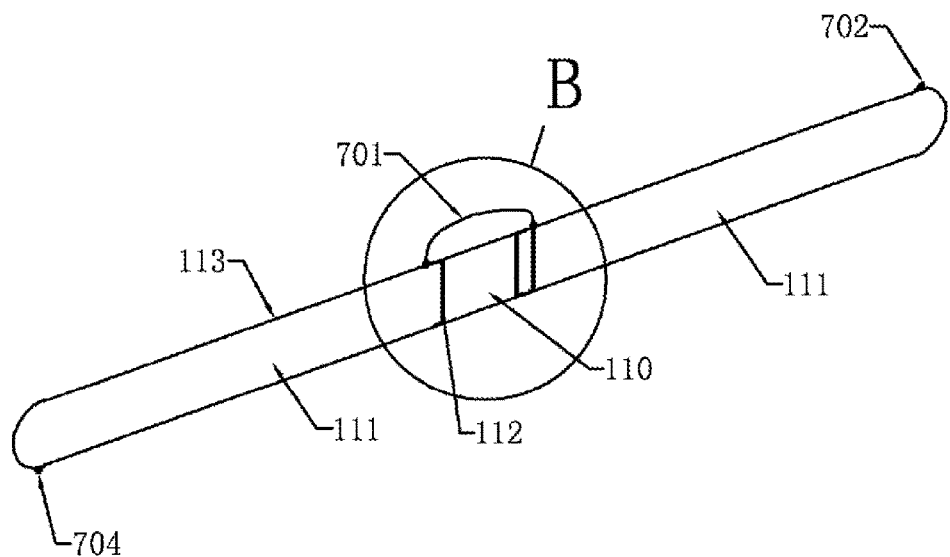
FIG. 3 illustrates a cross-sectional view of a central floating control pipe in FIG. 1.
Figure 4:
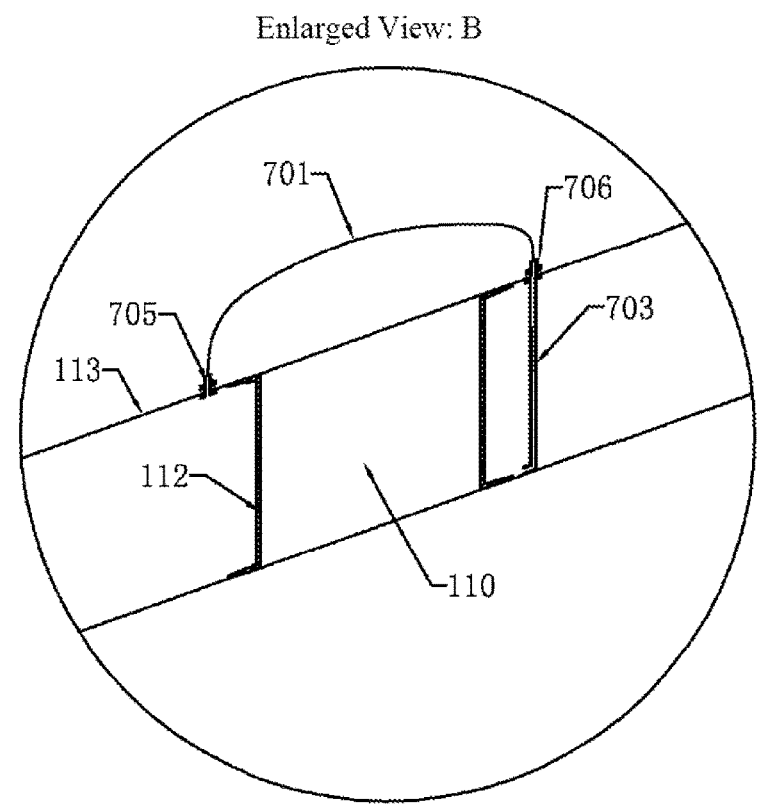
FIG. 4 illustrates an enlarged view of section B in FIG. 3.

Referring to FIGS. 3-4, FIG. 3 illustrates a cross-sectional view of a central floating control pipe in FIG. 1. The central floating control pipe 100 may have an inner wall 113. Two partition panels 112 are placed to divide the inner wall 113 to include a sealed cabin 110. The front and rear sections of the sealed cabin 110 may be unidirectional floating control cabins 111. The rear unidirectional floating control cabin 111 may have a cabin water inlet/outlet 706 located on the upper side of the central floating control pipe 100. An internal water inlet/outlet pipe 703 may be connected to the cabin water inlet/outlet 706. The cabin air inlet/outlet 705 located at the front of the orthogonal upper flange 211 may be connected by a connection pipe 701 to the cabin water inlet/outlet 706 located at the rear of the orthogonal upper flange 211.

In the present embodiment, the orthogonal node component may be the two orthogonal side flanges 210. The automatic depth-fixing and stabilizing part may be a depth-fixing and stabilizing pipe 400. The two strengthening ropes 407, the connected upper orthogonal flange 211 and the bottom flange 406, the top cap hole 402, and the strengthening rope hole 106 together may play a primary role to further strengthen and complete the structural function of the automatic depth-fixing and stabilizing part 400. The stability need may be accommodated by adjusting the position of the center of gravity. The adjustable buoyancy may be determined by the material, thickness and length of the central floating control pipe 100. The fixed net buoyancy may be adjusted by adjusting the volume of the sealed cabin 110. When the carried floating tubes 300 and the automatic depth-fixing and stabilizing part 400 provide sufficient total net buoyancy to the carrying device and the carried tidal stream generators, the volume of the sealed cabin 110 may be reduced to zero. That is, the two unidirectional floating control cabins 111 may be reduced to a single unidirectional floating control cabin. Further, when the adjustable buoyancy is zero, the carried tidal stream generators may be submerged into the water by adjusting the length of the automatic depth-fixing and stabilizing part 400 and the fixed net buoyancy.

In various other embodiments, the carrying device may have different configurations. For example, the orthogonal node component may be a pair of short tubes connected to the middle part of the central floating control pipe 100, and the carried floating tubes 300 may be carried on the short tubes. The orthogonal node component may also be a horizontal connection shaft penetrating the center of the central floating control pipe 100 orthogonally. When the connection between the orthogonal node component and the central floating control pipe 100 is fixed, the tidal stream generators carried on the outer flanges 301 of the carried floating tubes 300 may be bi-directional type. When the connection between the orthogonal node component and the central floating control pipe 100 is movable or rotatable, the tidal stream generators carried on the outer flanges 301 of the carried floating tubes 300 may be unidirectional type with automatic turning capability. The carried floating tubes 300 may be one of exemplary carrying frames. In other embodiments, the carrying frame may have other configurations. When the reduction of the water resistance of the carried floating tubes 300 is needed, ordinary truss frames or pipes with streamlined outer shape may be used. The automatic depth-fixing and stabilizing part 400 may also have different structures and configurations. For the convenience of assembling, shipping and maintenance, the automatic depth-fixing and stabilizing part may be carried on the top of the central floating control pipe 100. When the automatic depth-fixing and stabilizing part is carried on the bottom of the central floating control pipe 100, lower depth-fixing ropes 603 and a depth-fixing counterweight 602 shown in FIG. 9 may be used. In certain embodiments, rigid parts may be made of high quality glass fiber reinforced plastic suitable for seawater immersion or structural steel treated for anti-corrosion from seawater.

Figure 5:
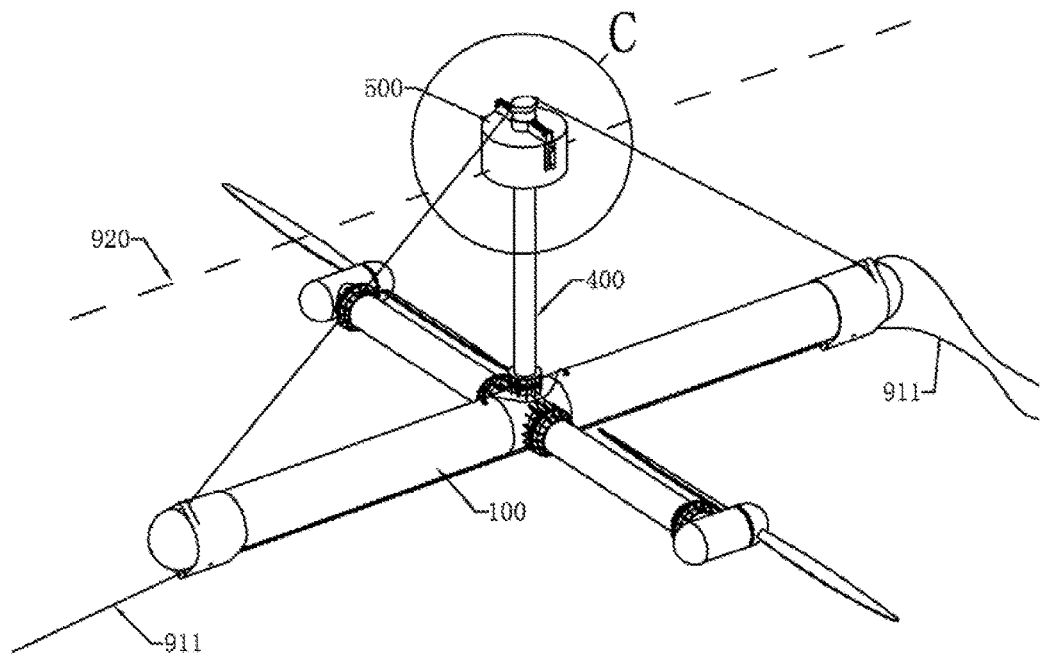
FIG. 5 illustrates a schematic view of another exemplary carrying device for tidal stream generators according to a second embodiment of the present invention.
Figure 6:
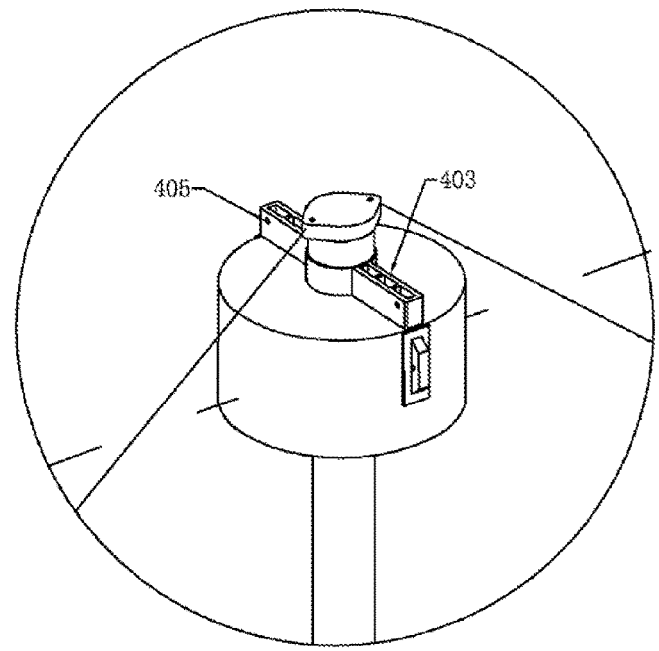
FIG. 6 illustrates an enlarged view of section C in FIG. 5.
Figure 7:
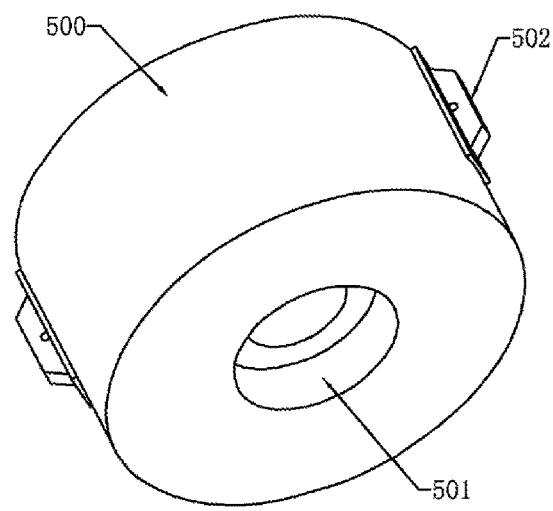
FIG. 7 illustrates a schematic view of a sliding float according to the disclosed embodiments.

Second Embodiment of a Multifunctional Carrying Device for a Tidal Stream Generator Referring to FIGS. 5-7, the present embodiment may be illustrated with emphases on the differences from the first embodiment. The automatic depth-fixing and stabilizing part 400 may be configured with a top frame 403 on the top. The top frame 403 may be configured with two top frame holes 405 on both left and right sides. In addition, a large sliding float 500 may be configured to enclose the top of the automatic depth-fixing and stabilizing part 400. The sliding float 500 may be a sealed housing. A sliding through-hole 501 may be configured in the center of the sliding float 500. Two lanyard components 502 may be configured on both sides of the sliding float 500. The sliding float 500 may slide vertically along the automatic depth-fixing and stabilizing part 400 through the sliding through-hole 501. When the sliding float 500 floats underneath the top frame 403, the sliding float 500 may be fastened to the top frame 403 by tying a rope through the top frame holes 405 and the lanyard components 502. The fastened sliding float 500 may improve the stability of the carrying device. When the tidal stream generators are lifted up for maintenance, the rope may be untied first. When the sliding float 500 has a huge volume, stiffening ribs may be configured inside the sliding float 500 as needed. An operational sealed door and ventilation tubes may be configured on the top of the sliding float 500. The sliding float 500 may be used to house various equipment(s) and may even serve as a living quarter for service personnel. When anchored by the mooring lines 911, the tidal stream generators may be semi-submerged beneath the sea water surface 920 to the depth where tidal-streams flow at maximum speeds.

When the sliding float 500 slides down to the bottom of the automatic depth-fixing and stabilizing part 400, this state may be defined as the upright initial state. Further, the sliding float 500 may be divided into an upper compartment and a lower compartment that are completely separated from each other. The upper compartment may have a configuration same as previously described. However, the lower compartment may be configured with an air inlet/outlet on the top, and a water inlet/outlet on the bottom. The air inlet/outlet of the lower compartment may be connected to an air controlling pipe. The other end of the air controlling pipe may be placed above the sea water surface. Thus, when the sea water surface is relatively calm, air may be pumped to fill the lower compartment of the sliding float 500 and the tidal-stream operators may continue to operate at the semi-submerged position. When the sea water surface is relatively stormy, sea water may be pumped to fill the lower compartment of the sliding float 500 such that the tidal stream generators may go deeper into the sea due to buoyancy reduction to avoid storm damage. When storm is over, sea water may be pumped out and air may be pumped in via the control air pipe to fill the lower compartment of the sliding float 500, and the tidal stream generators may resume operations in the semi-submerged state. In other embodiments, the sliding float 500 may not have separate compartments. Instead, the automatic depth-fixing and stabilizing part 400 may be configured in the same way as the lower compartment of the sliding float 500. Alternatively, the center section of the sealed cabin 110 in a multi-section configuration may be configured in the same way as the lower compartment of the sliding float 500. In these two cases, the operation of the tidal stream generators may achieve the same effect when encountering storms. Further, when the sliding float 500 is used to house various equipment(s) and accommodate service personnel, two automatic depth-fixing and stabilizing parts 400 may be evenly configured at the upper front and upper rear of the central floating control pipe 100. A top strengthening rope or a rigid connection frame may be configured between the tops of the two automatic depth-fixing and stabilizing parts 400. The sliding float 500 may be configured with sliding rings on the front and rear sides to replace the sliding through-hole 501 to slide onto the two automatic depth-fixing and stabilizing parts 400. The sliding float 500 may be in a streamlined shape to reduce the current flow resistance.

Figure 8:
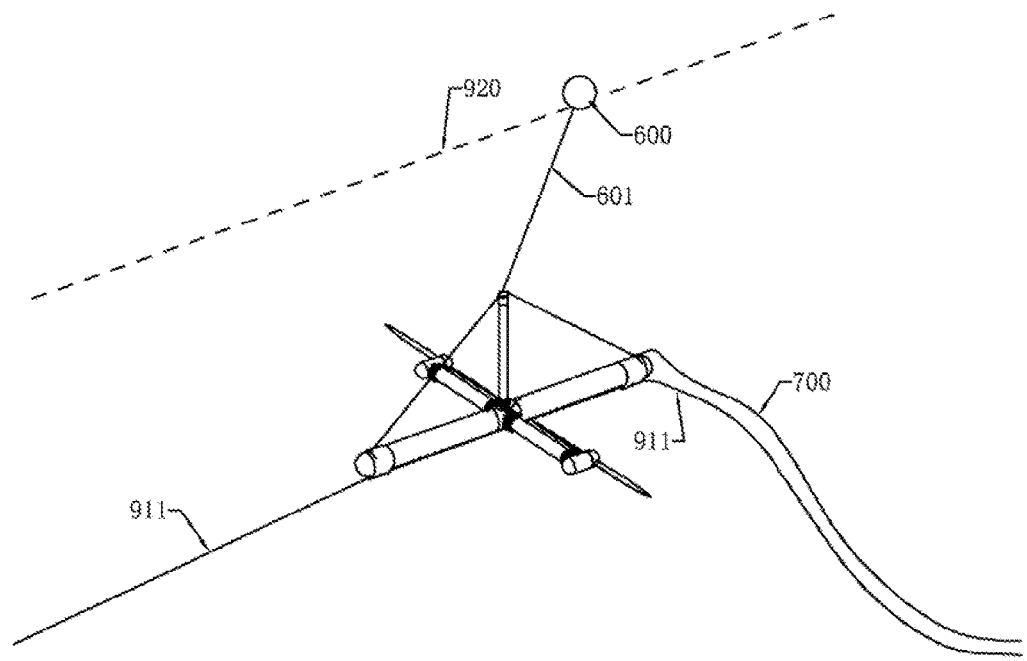
FIG. 8 illustrates a schematic view of another exemplary carrying device for tidal stream generators according to a third embodiment of the present invention.

Third Embodiment of a Multifunctional Carrying Device for a Tidal Stream Generator Referring to FIG. 8, the present embodiment may be illustrated with emphases on the differences from the first embodiment. An upper depth-fixing rope 601 and a depth-fixing floating body 600 may be connected to the top of the automatic depth-fixing and stabilizing part 400. In one embodiment, when the sea water surface 920 is stormy, tidal stream generators may be set by the depth-fixing floating body 600 and the mooring lines 911 precisely to the relatively deep sea water level where the storm impact is minimal. When the top of the carrying device is connected to the upper depth-fixing rope 601 and the depth-fixing floating body 600, the carrying device may be in an upright initial state.

Figure 9:
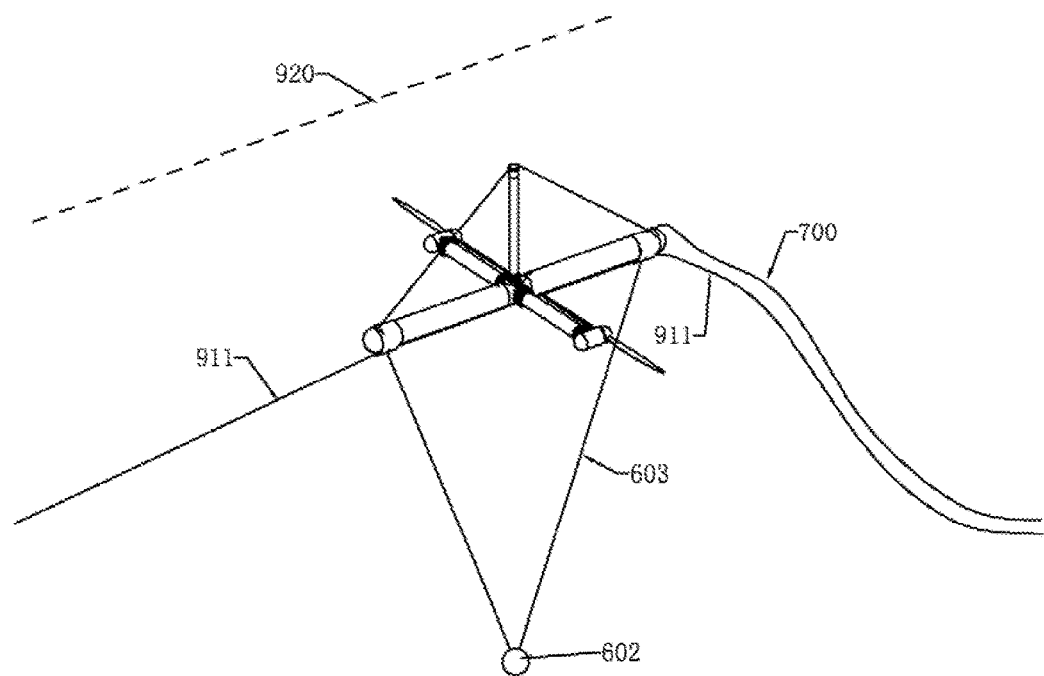
FIG. 9 illustrates a schematic view of another exemplary carrying device for tidal stream generators according to a fourth embodiment of the present invention.

Fourth Embodiment of a Multifunctional Carrying Device for a Tidal Stream Generator Referring to FIG. 9, the present embodiment may be illustrated with emphases on the differences from the first embodiment. Two lower depth-fixing ropes 603 may be connected to the lower side of both ends of the central floating control pipe 100. The other ends of the two equal length lower depth-fixing ropes 603 may be connected to the depth-fixing counterweight 602, forming a V-shape. In one embodiment, when the depth-fixing counterweight 602 is lowered to the sea bottom, the tidal stream generators may be set precisely to a pre-determined depth in the sea water. Because the tidal stream generators are anchored by the mooring lines 911, storm impact on the sea water surface 920 may be avoided. Further, interferences to sea traffic and visual disturbances to scenery views may be avoided. When the carrying device is connected to the depth-fixing counterweight 602 by the lower depth-fixing ropes 603, the carrying device may be in an upright initial state.

Figure 10:
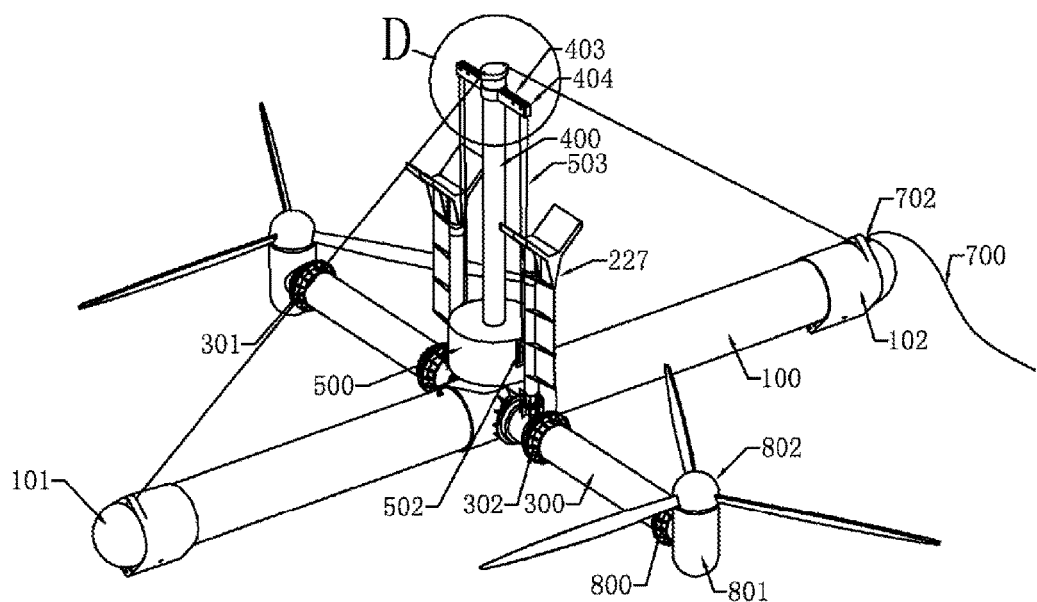
FIG. 10 illustrates a schematic view of another exemplary carrying device for tidal stream generators in an upright initial state according to a fifth embodiment of the present invention.
Figure 11:
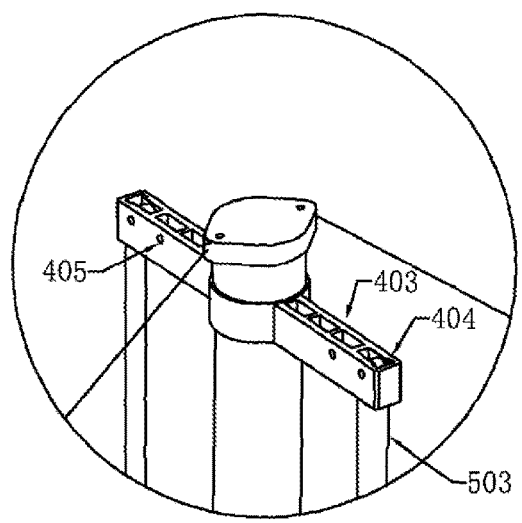
FIG. 11 illustrates an enlarged view of section D in FIG. 10.

Fifth Embodiment of a Multifunctional Carrying Device for a Tidal Stream Generator Referring to FIGS. 10-11, orthogonal node components may be connected horizontally and orthogonally to the center of the central floating control pipe 100. The connection may be rotatable. Inner flanges 302 of carried floating tubes 300 may be connected to the orthogonal node components. In one embodiment, the sliding float 500 may be settled at the bottom of the automatic depth-fixing and stabilizing part 400 due to gravity by its own weight. The automatic depth-fixing and stabilizing part 400 may be configured with a top frame 403 on the top. The top frame 403 may be configured with a plurality of top frame holes 405 and two top sliders 404 on both left and right sides. Two convection-assisted turning arms 227 connected to the outer ends of the two orthogonal node components and two impellers 802 may be carried on the upper side of the carried floating tubes 300. The orthogonal node component shafts, convection-assisted turning arms 227, carried floating tubes 300 and the tidal stream generators may be attached together and may rotate around the Y axis with respective to the central floating control pipe 100. Turning assisting ropes 503 may be used to assist the turning of the tidal stream generators. One end of turning assisting ropes 503 may be connected to the middle to upper section of the convection-assisted turning arms 227. The other end of the turning assisting ropes 503 may be connected to the lanyard components 502 through the top sliders 404 on the same side of the sliding float 500. When the carrying device is placed on land or has not been lowered into the water, the weight of the sliding float 500 may pull the turning assisting ropes 503 at the lanyard components 502 and drive the rotation of the convection-assisted turning arms 227, the carried floating tubes 300, and the carried tidal stream generators around the Y axis. As shown in FIG. 10, the convection-assisted turning arms 227 and the impellers 802 may face vertically upward.

Figure 12:
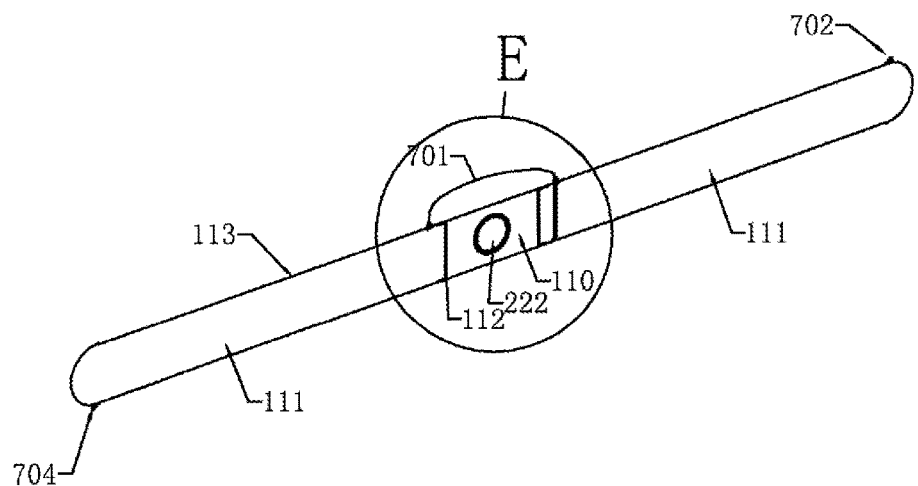
FIG. 12 illustrates a cross-sectional view of a central floating control pipe in FIG. 11.
Figure 13:
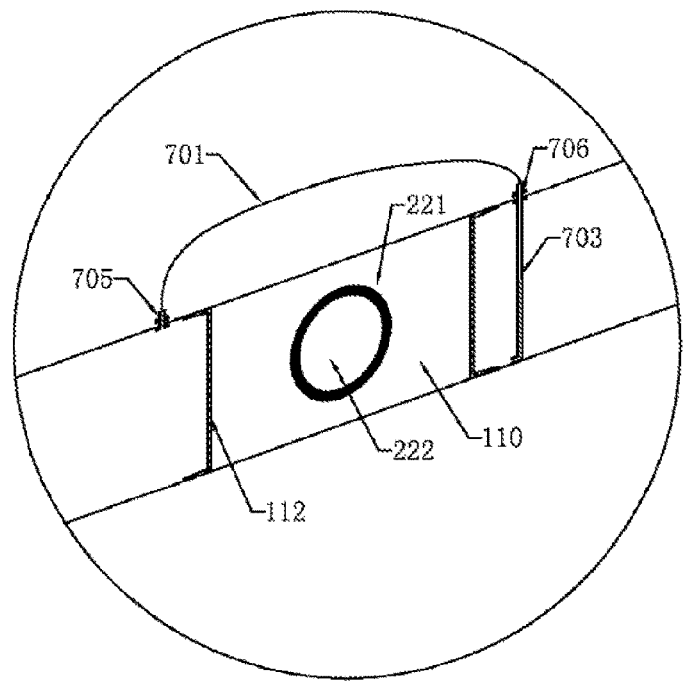
FIG. 13 illustrates an enlarged view of section E in FIG. 12.

Referring to FIGS. 12-13, the central floating control pipe 100 may have inner wall 113. The central floating control pipe 100 may be divided into three sections by two partition panels 112. The middle section may be a sealed cabin 110. The front and rear sections may be unidirectional floating control cabins 111 and may have equal space. A strengthening connection pipe 221 may penetrate through the sealed cabin 110. A connection shaft 222 may be configured inside the strengthening connection pipe 221. The unidirectional floating control cabins 111 may be configured in the front and the rear of the sealed cabin 110. The rear unidirectional floating control cabin 111 may have a cabin water inlet/outlet 706 located on the upper side of the central floating control pipe 100 and at the rear of the orthogonal upper flange 211. An internal water inlet/outlet pipe 703 may be connected to the cabin water inlet/outlet 706. The front unidirectional floating control cabin 111 may have a cabin air inlet/outlet 705 located on the upper side of the central floating control pipe 100 and at the front of the orthogonal upper flange 211. The cabin air inlet/outlet 705 and the cabin water inlet/outlet 706 may be connected by a connection pipe 701.

Figure 14:
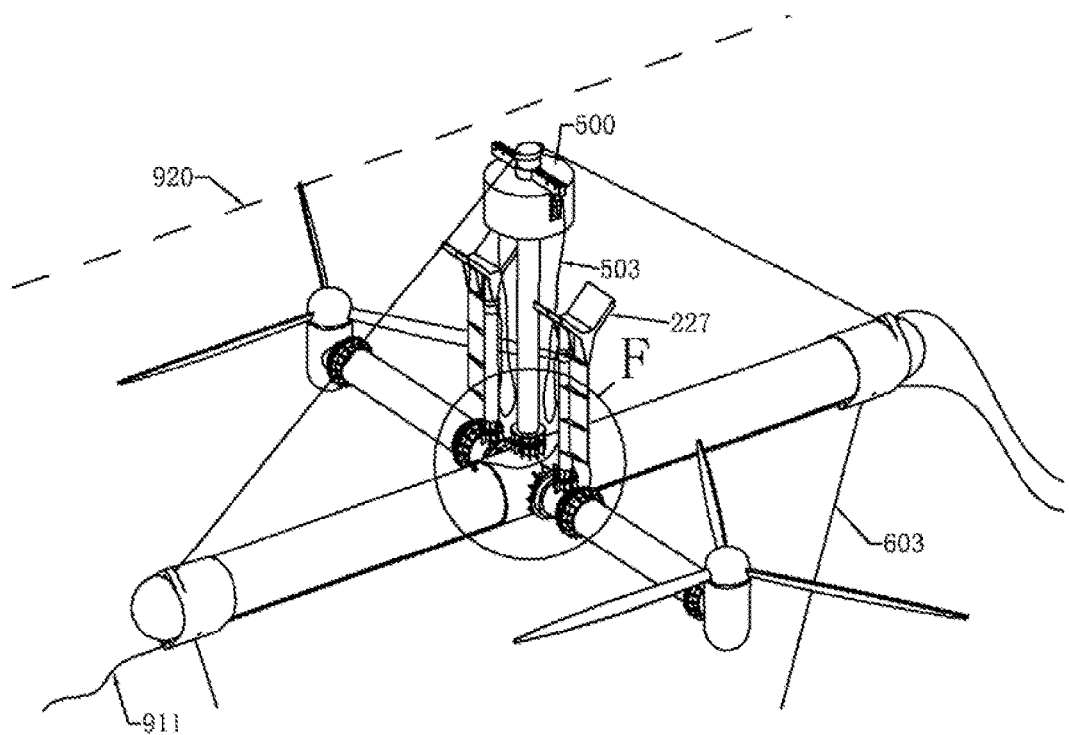
FIG. 14 illustrates a schematic view of another exemplary carrying device for tidal stream generators in an upright stationary floating state according to the fifth embodiment of the present invention.
Figure 15:
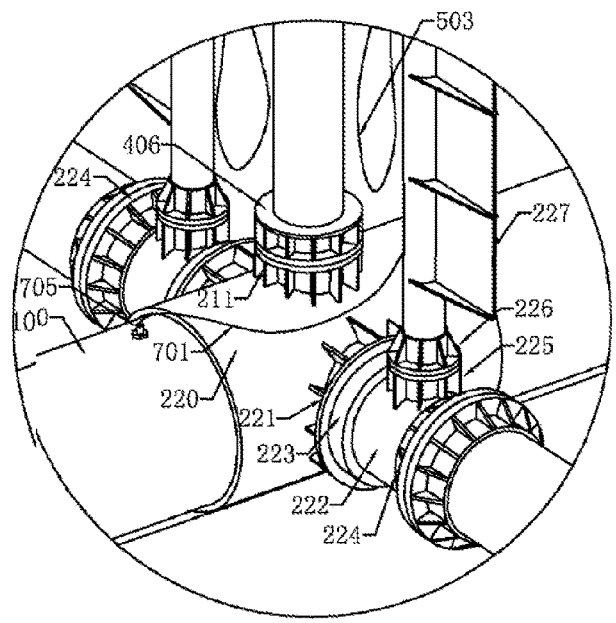
FIG. 15 illustrates an enlarged view of section F in FIG. 14.

Referring to FIGS. 14-15, the connection shaft 222, the convection-assisted turning arms 227, the carried floating tubes 300, and the tidal stream generators may be attached together to form a rotatable assembly. When the rotatable assembly is fully submerged, the gravity force and the buoyancy force of the rotatable assembly together may form an overturning moment to rotate the rotatable assembly to the position shown in FIG. 14. When the length direction of the convection-assisted turning arms 227 is parallel to the sea water surface 920, the overturning moment may reach its maximum. When the length direction of the convection-assisted turning arms 227 is perpendicular to the sea water surface 920, the overturning moment may be zero.

FIG. 15 clearly illustrates structural details of the orthogonal node component and other components at the center of the central floating control pipe 100 may be illustrated. An external strengthening pipe 220 may be configured to enclose and strengthen the center section of the central floating control pipe 100. A strengthening connection pipe 221 may be configured to penetrate through the external strengthening pipe 220 and the central floating control pipe 100. A connection shaft 222 may be configured inside the strengthening connection pipe 221. The connection shaft 222, the stopper rings 223 on both ends of the connection shaft 222, and the shaft flanges 224 together may form a connection shaft assembly. A shaft arm flange 225 may be configured on the upper side of each shaft flange 224. Each convection-assisted turning arm 227 may be connected to the corresponding shaft arm flange 225 through an arm flange 226. An orthogonal upper flange 211 may be configured on the upper side of the external strengthening pipe 220. The automatic depth-fixing and stabilizing part 400 may be connected to the orthogonal upper flange 211 through a bottom flange 406. A cabin air inlet/outlet 705 located at the front of the orthogonal upper flange 211 and a cabin water inlet/outlet 706 located at the rear of the orthogonal upper flange 211 may be connected by a connection pipe 701. Turning assisting ropes 503 may be loose and dangling. Reducing the friction between the connection shaft 222 and the strengthening connection pipe 221 may be desired for the automatic turning of the tidal stream generators. Thus, ideally, a wear-resistant and self-lubricating collar or sleeve may be configured between the connection shaft 222 and the strengthening connection pipe 221. Alternatively, a plurality of sections may be configured on both sides of the carried floating tubes 300 and the connection shaft 222 to adjust and balance the buoyancy forces. The friction force between the connection shaft 222 and the strengthening connection pipe 221 may be reduced by reducing the positive pressure between the connection shaft 222 and the strengthening connection pipe 221.

Figure 16:
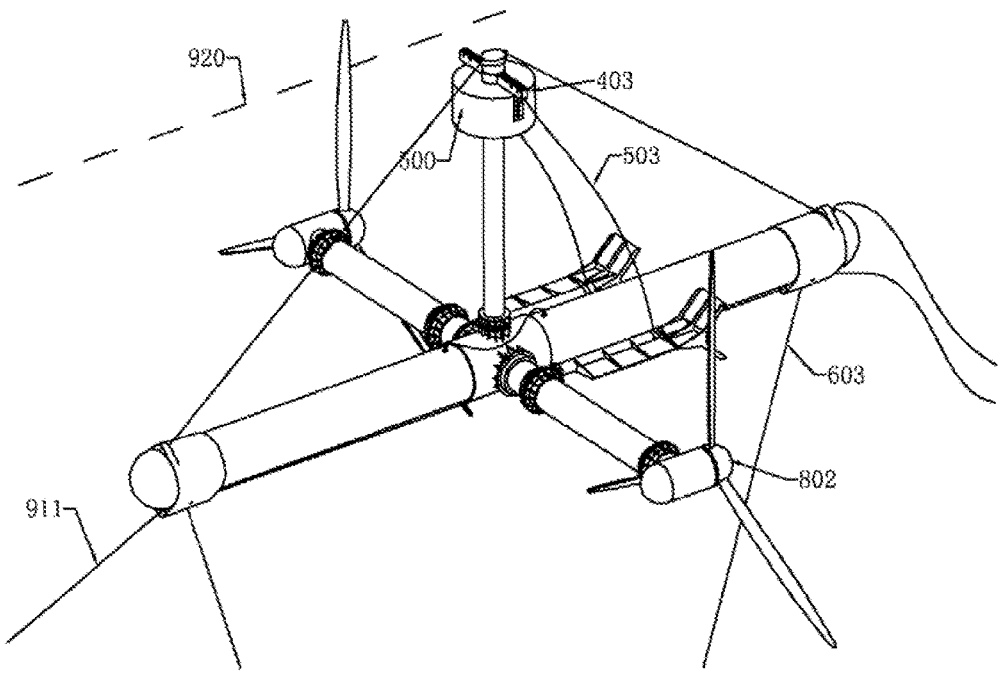
FIG. 16 illustrates a schematic view of another exemplary carrying device for tidal stream generators in an upright flowing floating state according to the fifth embodiment of the present invention.

Referring to FIG. 16, the rotatable assembly may provide certain, though not significant, overturn moment. When tidal-streams are present, the mooring lines 911 may be tightened and stretched. The convection-assisted turning arms 227 and the impellers 802 of the carried tidal stream generators may be pushed by strong currents to produce a strong current torque. The current torque may be much greater than the overturn moment and may easily overcome the overturn moment to force the tidal stream generators to generate electricity. When the tidal stream generators start to generate electricity, the tidal stream generators may be in the upright flowing floating state. At this moment, the sliding float 500 may be pushed up to the bottom of the top frame 403 by the buoyancy force, and the convection-assisted turning arms 227 may rotate to the position as shown in FIG. 16 by the strong current torque. When the tidal-streams recede, the overturning moment may push the convection-assisted turning arms 227 and the carried tidal stream generators back to the upright stationary floating state. When the tidal-streams return, the tidal stream generators may rotate to the upright flowing floating state again by the current torque to generate electricity. Thus, the tidal stream generators may automatically rotate back and forth to generate electricity in response to tidal fluctuations.

In addition, referring to FIGS. 10, 14 and 16, when the carrying device ascends to the sea water surface, the gravity force of the sliding float 500 may turn into a rotational torque through the turning assisting ropes 503. In the meantime, the gravity force of the rotatable assembly may also turn into another rotational torque. The former may be greater than the latter. The lengths of the automatic depth-fixing and stabilizing part 400, the turning assisting ropes 503 and the convection-assisted turning arms 227 may be determined by satisfying the following conditions. When the sliding float 500 is settled at the bottom of the automatic depth-fixing and stabilizing part 400 and the convection-assisted turning arms 227 are pointing upward vertically, the turning assisting ropes 503 may be tightened and stretched. When the sliding float 500 is settled underneath the top frame 403, the turning assisting ropes 503 may not restrict the turning of the convection-assisted turning arms 227. Only when these conditions are met, the automatic flow driven turning function may be achieved.

Figure 17:
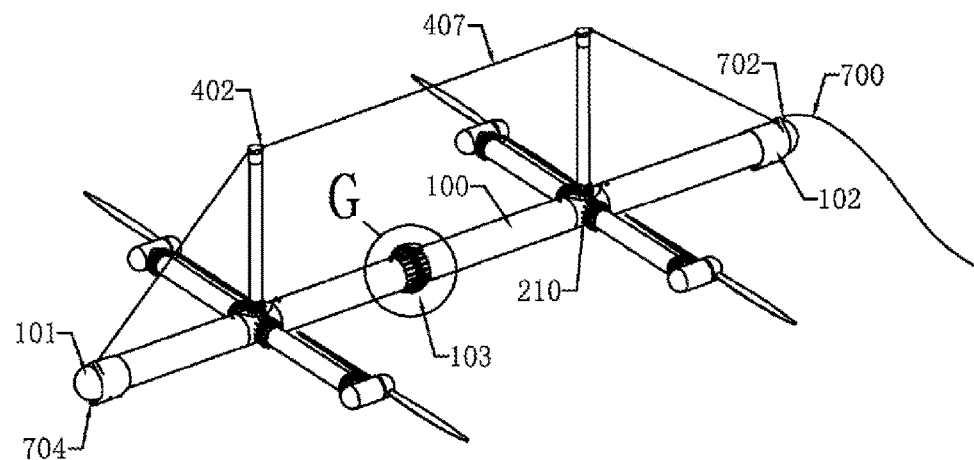
FIG. 17 illustrates a schematic view of another exemplary carrying device for tidal stream generators in an upright initial state according to a sixth embodiment of the present invention.
Figure 18:
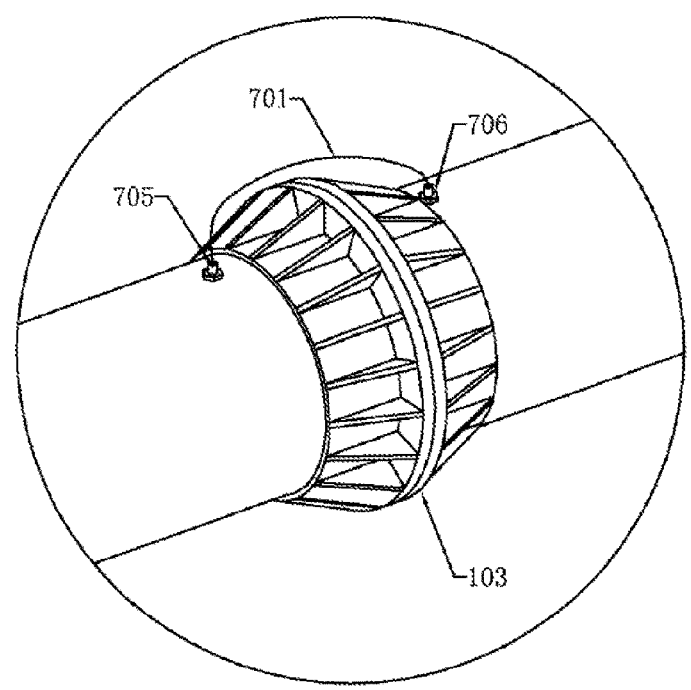
FIG. 18 illustrates an enlarged view of section G in FIG. 17.
Figure 19:
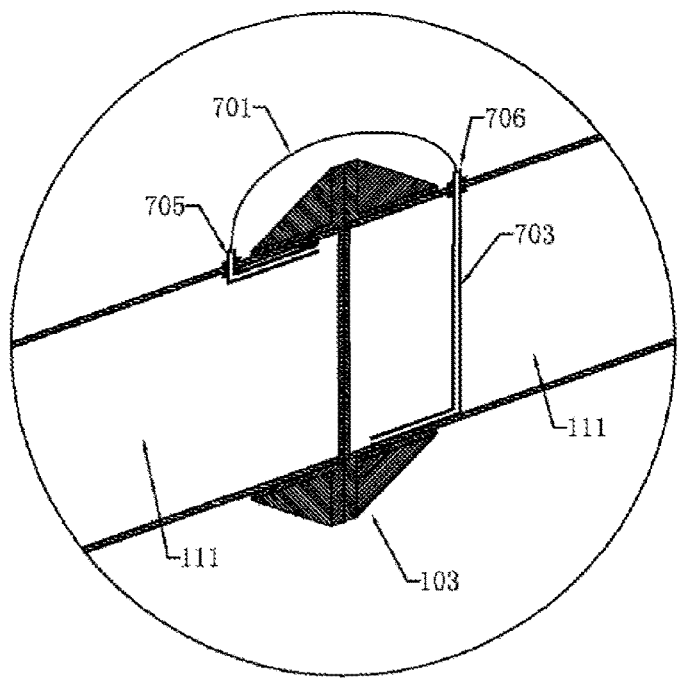
FIG. 19 illustrates a cross-sectional view of FIG. 18.

Sixth Embodiment of a Multifunctional Carrying Device for a Tidal Stream Generator Referring to FIGS. 17-19, a main connection flange 103 may be used to connect two previously described carrying device to form a composite multifunctional carrying device for tidal stream generators. In one embodiment, the pipe water inlet/outlet 704 located on the lower front side of the front cap 101 may be preserved. The pipe air inlet/outlet 702 located on the upper rear side of the rear cap 102 may be connected to a remote air pipe 700. The cabin air inlet/outlet 705 may be configured on the upper front side of the main connection flange 103, and the cabin water inlet/outlet 706 may be configured on the upper rear side of the main connection flange 103. The internal water inlet/outlet pipe 703 may be connected to the cabin water inlet/outlet 706. The cabin air inlet/outlet 705 located at the upper front side of the main connection flange 103 and the cabin water inlet/outlet 706 located at the upper rear side of the main connection flange 103 may be connected by the connection pipe 701. Top cap holes 402 may be configured on the top of each automatic depth-fixing and stabilizing part 400. The front and rear automatic depth-fixing and stabilizing parts 400 may share the strengthening rope 407 configured between the top cap holes 402. In other embodiments, the main connection member may be a housing with H shaped axial cross section. Four tidal stream generators may be carried by the composite multifunctional carrying device such that the unit cost for mounting each tidal stream generator may be reduced. As a result, the average cost for the electricity generation and transmission may be lowered and the operation may be more stable.

Other Embodiments of a Multifunctional Carrying Device for a Tidal Stream Generator The seventh embodiment through the tenth embodiment of the present invention may take optimizing and combining strategy similar to the sixth embodiment of the present invention. The sixth embodiment may be the result of optimizing and combining the first embodiment. The seventh embodiment may be the result of optimizing and combining the second embodiment. And so on so forth. In the embodiments from the seventh through the tenth, when two depth-fixing floating tubes are combined, a twice as large depth-fixing floating tube may be used to replace the two smaller depth-fixing floating tubes. At the same time, two upper depth-fixing ropes may be tied to the larger depth-fixing floating tube. When four lower depth-fixing ropes and two depth-fixing counterweights are used, two thicker lower depth-fixing ropes and one twice as heavy counterweight may be used for the replacement. The two thicker lower depth-fixing ropes may be tied to the lower side of both ends of the central floating control pipe 100. Alternatively, the two thicker lower depth-fixing ropes may be tied to rope tying locations on the lower side of the central floating control pipe 100 by means of the orthogonal side flanges 210.

Here, the main connection member may be a pair of flanges or a housing with H shaped axial cross section. Thus, the present disclosure may not only reduce the unit cost for mounting each tidal stream generator, but also may lower the average cost for the electricity generation and transmission and make the operation more stable. On one hand, experiments show the impellers of tidal stream generators may only capture no more than 50% of the kinetic energy of the sea water currents. The sea water currents may still possess high kinetic energy after passing through the impellers initially. After a short distance, the sea water current subject to the first pass may quickly regain the kinetic energy loss from the surroundings and reach the same kinetic energy level as the surrounding sea water currents. Thus, deploying tidal stream generators in a high density may not compromise the energy capturing efficiency. On the other hand, regardless of the scale, the electricity transmission and distribution in the harsh marine environment may have a very high base cost. Thus, large scale power generation, transmission and distribution may have obvious cost advantages.

The initial voltage of the electricity generated by the tidal stream generators may be low and unstable. Because the onshore or offshore power station that is able to process such electricity in large scale is often far away, the voltage of the electricity generated by the tidal stream generators may have to be raised by step-up transformers for long distance transmission. In certain embodiments, the step-up transformers may be housed inside the sliding float 500 or under the central floating control pipe 100. A plurality of mounting interface flanges may be configured evenly underneath the central floating control pipe 100. During the assembly stage, step-up transformers with matching interface flanges may be installed directly onto the mounting interface flanges underneath the central floating control pipe. Alternatively, the step-up transformers may be carried indirectly through a separate mounting enclosure with matching mounting interfaces.

The following provides detailed description of the operating principle of the carrying device for carrying tidal stream generators according to the present disclosure.

Figure 20:
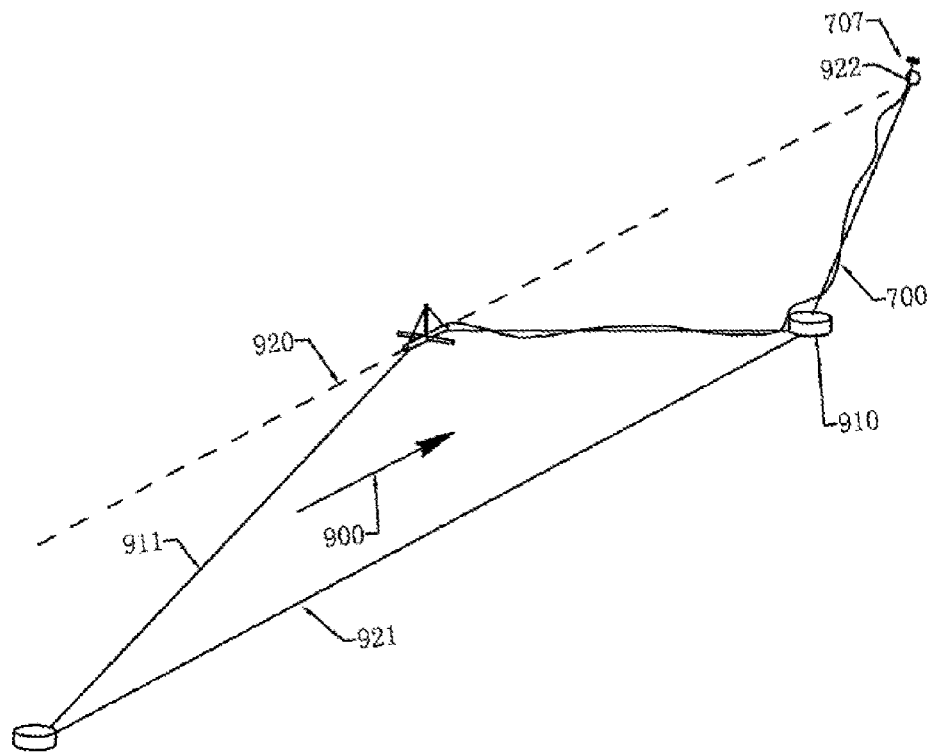
FIG. 20 illustrates a schematic view of another exemplary carrying device for tidal stream generators floating at the sea water surface using the sea water surface as the depth-fixing reference according to the disclosed embodiments.

Referring to FIG. 20, the upcoming currents 900 may flow in the direction shown as an arrow in the figure. The carrying device carried with tidal stream generators may be floating on the sea water surface 920. Two mooring anchors 910 separated by a distance greater than four times the depth of the sea water may be configured at the front and rear sides of the carrying device. The mooring anchors 910 may be anchored to the sea bottom 921. Two equal length mooring lines 911 may be used to tie the two mooring anchors to the front and rear ends of the carrying device. The remote air pipe 700 connected to the air inlet/outlet located at the upper rear end of the carrying device carried with tidal stream generators may run with the mooring line 911 to reach a remote control point 922 and connect to a control switch 707. Underwater cables may be laid as needed on the sea bottom and along the mooring lines 911.

Figure 21:
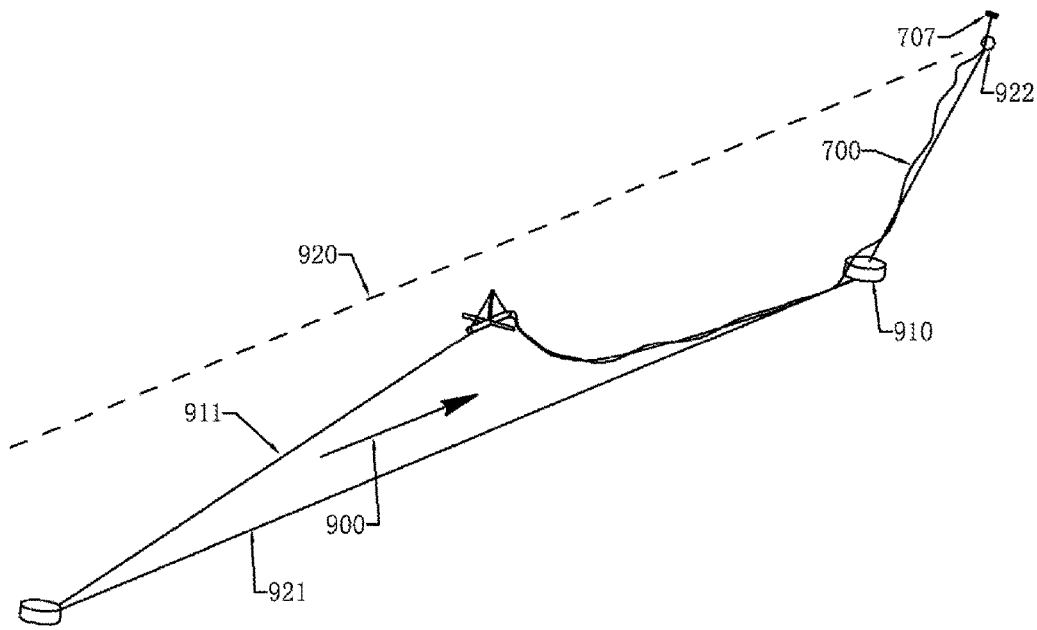
FIG. 21 illustrates a schematic view of an exemplary floating type carrying device for tidal stream generators settled at the desired depth using the sea water surface as the depth-fixing reference according to the disclosed embodiments.

FIG. 21 illustrates a schematic view of an exemplary floating type carrying device for tidal stream generators settled at the desired depth using sea water surface as depth-fixing reference according to the present disclosure. The floating type carrying device using the sea water surface 920 as depth-fixing reference may be suitable for deep seas with frequent and severe storms. The floating type carrying device may be operated in the following way. When the upcoming currents 900 recede or surge, the control switch 707 at the remote control point 922 may be activated to apply a negative air pressure to the remote air pipe 700. When sea water flows out of the control switch 707, the depth-fixing may be completed automatically. Conversely, when the carrying device with tidal stream generators carried already settled at the pre-determined depth needs to be raised, a positive air pressure may be applied to the remote air pipe 700 until the carrying device is floating on the sea water surface 920. This type of depth-fixing method may be flexible and adaptable though the depth-fixing is coarse.

Figure 22:
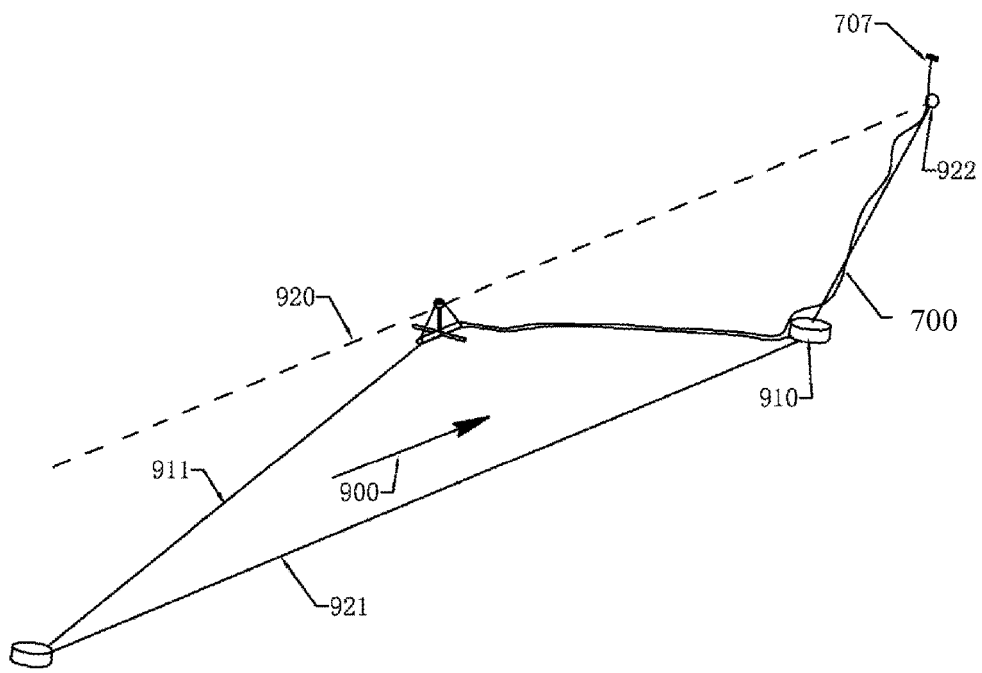
FIG. 22 illustrates a schematic view of an exemplary semi-submerged type carrying device for tidal stream generators settled at the desired depth using the sea water surface as the depth-fixing reference according to the disclosed embodiments.

FIG. 22 illustrates a schematic view of an exemplary semi-submerged type carrying device for tidal stream generators settled at the desired depth using sea water surface as depth-fixing reference according to the present disclosure. The semi-submerged type carrying device using the sea water surface 920 as depth-fixing reference may be suitable for shallow seas with less severe storms. The semi-submerged type carrying device may be operated in the way same as the floating type carrying device. This type of depth-fixing method may be able to settle the tidal stream generators precisely in the sea water under the sea water surface 920 where the sea water flows at maximum speed. However, the stormy sea water surface 920 may have a negative impact on the equipment.

Figure 23:
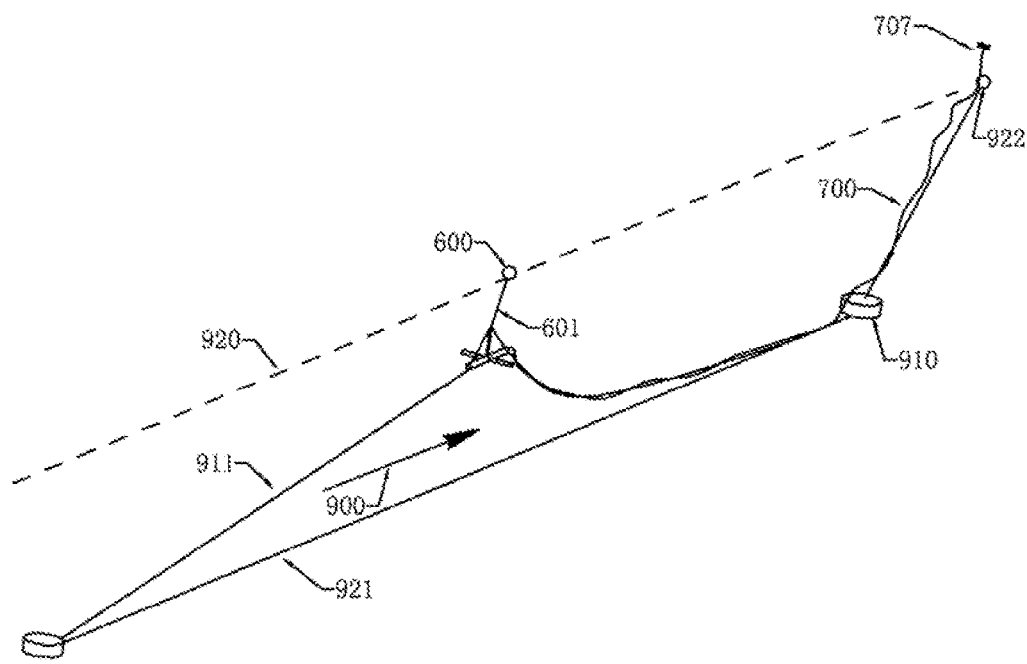
FIG. 23 illustrates a schematic view of an exemplary hanging type carrying device for tidal stream generators settled at the desired depth using the sea water surface as the depth-fixing reference according to the disclosed embodiments.

FIG. 23 illustrates a schematic view of an exemplary hanging type carrying device for tidal stream generators settled at the desired depth using sea water surface as depth-fixing reference according to the present disclosure. Referring to FIG. 23, the hanging type carrying device using the sea water surface 920 as the initial depth reference may be suitable for deep seas with frequent and severe storms. The hanging type carrying device may be operated in the way same as the floating type carrying device. This type of depth-fixing method may be able to precisely set the depth of the tidal stream generators and may be less affected by the stormy sea water surface 920. However, the depth-fixing floating body 600 and the upper depth-fixing rope 601 may be difficult to operate and maintain.

Figure 24:
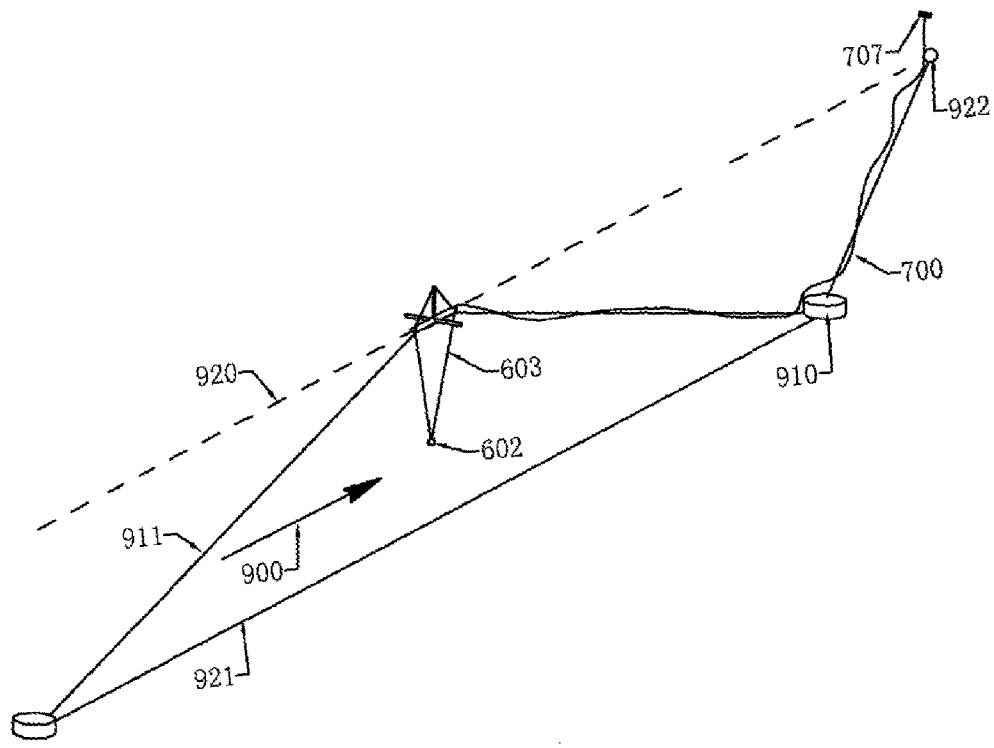
FIG. 24 illustrates a schematic view of another exemplary carrying device for tidal stream generators floating at the sea water surface using the sea bottom as the depth-fixing reference according to the disclosed embodiments.

FIG. 24 illustrates a schematic view of another exemplary carrying device for tidal stream generators floating at the sea water surface using sea bottom as depth-fixing reference according to the present disclosure. Referring to FIG. 24, sea bottom may be used as depth-fixing reference. An automatic depth-fixing component may be configured on the lower side of the multifunctional carrying device for tidal stream generators. The automatic depth-fixing component may be a depth-fixing counterweight 602 and V-shaped equal length lower depth-fixing ropes 603. When the depth-fixing counterweight 602 is included, the carrying device and the carried tidal stream generators may have a negative fixed net buoyancy force in the sea water. When the depth-fixing counterweight 602 is excluded, the carrying device and the carried tidal stream generators may have a fixed net buoyancy force slightly smaller than the net sinking force of the depth-fixing counterweight 602. Under no circumstances, the fixed net buoyancy force may allow the tidal stream generators to touch the sea bottom. Thus, the larger the net sink force of the depth-fixing counterweight is, the more precise the depth-fixing is.

Figure 25:
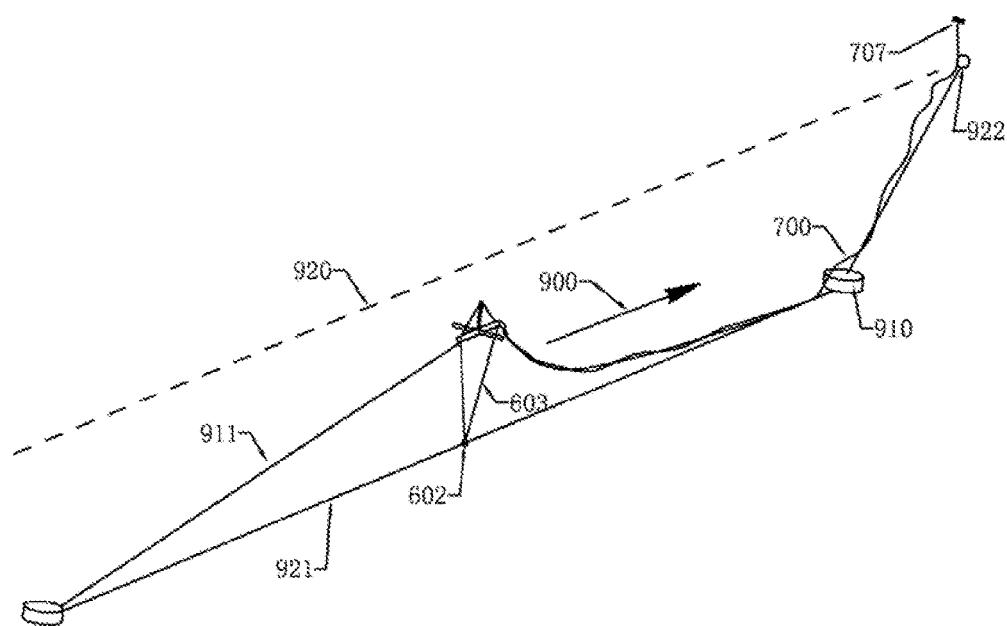
FIG. 25 illustrates a schematic view of an exemplary fully submerged type carrying device for tidal stream generators settled at the desired depth using the sea bottom as the depth-fixing reference according to the disclosed embodiments.

FIG. 25 illustrates a schematic view of an exemplary fully submerged type carrying device for tidal stream generators settled at the desired depth using sea bottom as depth-fixing reference according to the present disclosure. Referring to FIG. 25, the fully submerged type carrying device using the sea water surface 920 as depth-fixing reference may be suitable for relatively deep but not too deep sea water. The fully submerged type carrying device may be operated in the way same as the floating type carrying device. When fully submerged type carrying device is settled at the predetermined depth, the tidal fluctuations and stormy sea water surface may have minimal negative impact with the following reasons. The storms on the sea water surface may not reach sea water at the relatively deep depth. The storm damage on the sea water surface may have no direct negative impact on the carrying device and the carried tidal stream generators. During the tidal fluctuation periods, the carrying device and the carried tidal stream generators may be subject to tidal-stream flows to produce a relatively large sinking force. The relatively large sinking force may substantially reduce the tension of the lower depth-fixing ropes 603 to nearly zero. However the fixed net buoyancy force of the carrying device and the carried tidal stream generators may completely offset the relatively large sinking force such that the carrying device and the carried tidal stream generators already settled at the certain depth may not sink much. When the tidal-streams fade, the fixed net buoyancy force of the carrying device and the carried tidal stream generators may be completely offset by the depth-fixing counterweight 602. At this moment, the lower depth-fixing ropes 603 may have maximum tension. Apparently, the fully submerged type carrying device may have many benefits and may be the safest even under extreme conditions. Not only the storm damage impact on the sea water surface 920, but also interferences to sea traffic and visual disturbances to scenery views may be avoided. However, when the sea water is too deep, the fully submerged type carrying device may not be the desired choice.

FIGS. 20-25 provide detail descriptions for the operating principles and methods of using the multifunctional carrying device for carrying tidal stream generators according to the present disclosure.

Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY

The disclosed multifunctional carrying device for carrying tidal stream generators according to the present disclosure may include exemplary four major load bearing structures: the central floating control pipe, the orthogonal node component, the carrying frame and the automatic depth-fixing and stabilizing part. Although the assembling of these structures may be simple and straightforward, the resulting carrying device may be strong and robust. The carrying device may provide the high efficient control function over the balance between the buoyancy force and the sinking force and the convenient automatic depth-fixing and stabilizing function by configuring and controlling the variable buoyancy force of the central floating control pipe, and the variable buoyancy force and the depth-fixing rope length of the automatic depth-fixing and stabilizing part.

What is claimed is:
1. A multifunctional carrying device for a tidal stream generator, comprising:
an elongated main floating body; and
a carrying frame, extending horizontally toward a left side and a right side from a center part of the elongated main floating body and having an end part used for carrying the tidal stream generator,
wherein:
the elongated main floating body is a central floating control pipe with two ends sealed;

the two ends of the central floating control pipe are configured with cable tying locations;

a pipe air inlet/outlet is disposed above one end of the central floating control pipe;

a pipe water inlet/outlet is disposed below another end of the central floating control pipe;

a remote air pipe has one end connected to the pipe air inlet/outlet and has another end connected to a control switch;

an orthogonal node component is configured to connect the carrying frame with the central floating control pipe; and an automatic depth-fixing and stabilizing part, is evenly disposed, along a vertical bisection plane of the orthogonal node components, on rigid parts that are directly connected to the orthogonal node components.

2. The multifunctional carrying device for the tidal stream generator of claim 1, wherein:

the central floating control pipe is divided into at least a first unidirectional floating control cabin and a second unidirectional floating control cabin;

the first unidirectional floating control cabin is configured with a cabin air inlet/outlet on an upper side of one end and the pipe water inlet/outlet on a lower side of another end of the first unidirectional floating control cabin, and the second unidirectional floating control cabin is configured with the pipe air inlet/outlet on an upper side of one end and a cabin water inlet/outlet on a lower side of another end of the second unidirectional floating control cabin;

the first and second unidirectional floating control cabins are configured in one direction;

the central floating control pipe is internally, evenly divided to include at least one sealed cabin; and a connection pipe is configured to have one end connected to the cabin water inlet/outlet of the second unidirectional floating control cabin, and to have another end connected to the cabin air inlet/outlet of the first unidirectional floating control cabin.

3. The multifunctional carrying device for the tidal stream generator of claim 2, wherein:

the automatic depth-fixing and stabilizing part includes an automatic depth-fixing and stabilizing pipe with both ends sealed;

the automatic depth-fixing and stabilizing pipe extends upward from an orthogonal node between the orthogonal node component and the central floating control pipe; and a strengthening rope has one end connected to the top of the automatic depth-fixing and stabilizing pipe and has another end connected to one end of the central floating control pipe.

4. The multifunctional carrying device for the tidal stream generator of claim 3, further including:

a sliding float configured to slide upward and downward along the automatic depth-fixing and stabilizing pipe; and a top frame configured on top of the automatic depth-fixing and stabilizing pipe to confine a sliding itinerary of the sliding float.

5. The multifunctional carrying device for the tidal stream generator of claim 3, wherein:

a top end of the automatic depth-fixing and stabilizing pipe is connected to one end of an upper depth-fixing rope, and the upper depth-fixing rope has another end connected to a depth-fixing floating body; and the depth-fixing floating body is configured to provide a buoyancy force to prevent the tidal stream generator from touching a sea bottom.

6. The multifunctional carrying device for the tidal stream generator of claim 1, wherein:

the central floating control pipe is configured with lanyard holes on a lower side of both ends;

the automatic depth-fixing and stabilizing part includes two lower depth-fixing ropes having equal lengths and a depth-fixing counterweight; and each lower depth-fixing rope has one end connected to of the central floating control pipe and has another end connected to the depth-fixing counterweight, such that the two lower depth-fixing ropes for a V-shape after connection.

7. The multifunctional carrying device for the tidal stream generator of claim 4, wherein:

the orthogonal node component includes an external strengthening pipe, a strengthening connection pipe, a connection shaft, stopper rings, and shaft flanges;

the external strengthening pipe is attached to an outer surface of the central floating control pipe;

the strengthening connection pipe penetrates horizontally and orthogonally through and attached to each of the external strengthening pipe and the central floating control pipe;

the connection shaft is configured passing through the strengthening connection pipe;

each of both ends of the connection shaft is configured with one stopper ring and one shaft flange; and the connection shaft is capable of rotating with respect to the strengthening connection pipe.

8. The multifunctional carrying device for the tidal stream generator of claim 7, further including:

a assisted turning arm attached to a rotatable part of the orthogonal node component or to the carrying frame, and extending in a radial direction;

a top slider configured on a left side and right side of the top frame;

a rope tying location configured on an outer side of the sliding float; and a turning assisting rope configured to have one end connected to the assisted turning arm and to have another end pass through the top slider to be connected to the rope tying location on a same side.

9. A method of sing a carrying device for a tidal stream generator, comprising:

forming the carrying device for the tidal stream generator according to claim 1;

placing at least two mooring anchors separated by a distance greater than four times of a sea depth according to a flowing direction of a tidal-stream, leading two mooring lines from two front and rear mooring anchors such that the two mooring lines having an equal length are converged from opposite directions onto a sea surface; and marking the sea surface using floaters;

on a land or a boat equipped with an underwater engineering equipment, carrying the tidal stream generator onto an end of a carrying frame based on a respective upright initial state of the carrying device and the carried tidal stream generator;

using the underwater engineering equipment, moving the carrying device carried with the tidal stream generator in an upright state into a sea water;

dragging the carrying device carried with the tidal stream generator to a target sea water for tidal stream generating, tying the two mooring lines to the cable tying locations at the both ends of the central floating control pipe, and connecting all cables;

when the tidal-stream is absent or when the tidal-stream flows upcoming in a direction from a front end to a rear end of the central floating control pipe, applying a negative air pressure to the remote air pipe through the control switch at a remote control point to gradually fill the central floating control pipe with the sea water until the carrying device reaches a depth where a fixed net buoyancy force completely offsets the sinking force of the carrying device and the carried tidal stream generator, the carrying device stops descending and automatically completes a depth-fixing process; and when the tidal-stream is absent or when the tidal-stream flows upcoming in the direction from the front end to the rear end of the central floating control pipe, feeding compressed air into the remote air pipe at a remote control point to gradually drain all the sea water out of the central floating control pipe to allow the carrying device and the carried tidal stream generator to ascend to above the sea water surface in the upright state.

10. A method of using a carrying device for a tidal stream generator, comprising:

forming the carrying device for the tidal stream generator according to claim 6;

placing at least two mooring anchors separated by a distance greater than four times of a sea depth according to a flowing direction of a tidal-stream, leading two mooring lines from two front and rear mooring anchors such that the two mooring lines having an equal length are converged from opposite directions onto a sea surface; and marking the sea surface using floaters;

on a land or a boat equipped with an underwater engineering equipment, assembling the tidal stream generator and a carrying frame based on a respective upright initial state thereof, and using a temporary rope to tie the depth-fixing counterweight to a lower middle section of the central floating control pipe;

using the underwater engineering equipment, moving the carrying device carried with the tidal stream generator in an upright state into a sea water;

dragging the carrying device carried with the tidal stream generator to a target sea water for tidal stream generating and configured with mooring anchors and mooring lines, tying the two mooring lines to the cable tying locations at the both ends of the central floating control pipe, untying the temporary rope to allow the depth-fixing counterweight to descend freely, and connecting all other cables;

when the tidal-stream is absent or when the tidal-stream flows upcoming in a direction from a front end to a rear end of the central floating control pipe, applying a negative air pressure to the remote air pipe through the control switch at a remote control point, when the central floating control pipe is completely filled with the sea water, the depth-fixing counterweight reaches a bottom of the sea water, while the carrying device with the carried tidal stream generator automatically hovers at a pre-set depth; and when the tidal-stream is absent or when the tidal-stream flows upcoming in the direction from the front end to the rear end of the central floating control pipe, feeding compressed air into the remote air pipe at a remote control point to gradually drain all the sea water out of the central floating control pipe to allow the carrying device and the carried tidal stream generator to ascend to above the sea water surface in the upright state.

* * * * *